United States Patent

Guinand et al.

Patent Number: 5,210,745
Date of Patent: May 11, 1993

[54] FRAME RESTRUCTURING INTERFACE FOR DIGITAL BIT STREAMS MULTIPLEXED BY TIME-DIVISION MULTIPLEXING DIGITAL TRIBUTARIES WITH DIFFERENT BIT RATES

[75] Inventors: Jacques Guinand, Saint Remy les Chevreuse; Jean-Loup Ferrant, Boulogne Billancourt; Jean-Claude Faye, Gif Sur Yvette; Hervé Roux, Massy, all of France

[73] Assignee: Alcatel Cit, Paris, France

[21] Appl. No.: 647,628

[22] Filed: Jan. 25, 1991

[30] Foreign Application Priority Data

Jan. 29, 1990 [FR] France .............................. 90 00991

[51] Int. Cl.⁵ ........................................... H04L 29/10
[52] U.S. Cl. ....................................... 370/79; 370/84; 370/112
[58] Field of Search ................... 370/105.1, 105, 81, 370/110.1, 84, 112, 102, 79, 82

[56] References Cited

U.S. PATENT DOCUMENTS

| | | | |
|---|---|---|---|
| 3,961,139 | 6/1976 | Bowman et al. | 370/85.15 |
| 4,394,758 | 7/1983 | Donne | 370/105 |
| 4,397,017 | 8/1983 | Rokugo | 370/102 |
| 4,435,803 | 3/1984 | Das et al. | 370/110.1 |
| 4,589,130 | 5/1986 | Galand | 370/81 |
| 4,608,684 | 8/1986 | Upp | 370/58.1 |
| 4,667,324 | 5/1987 | Graves | 370/102 |
| 4,777,634 | 10/1988 | Burger et al. | 370/102 |
| 4,893,306 | 1/1990 | Chao et al. | 370/112 |
| 4,910,731 | 3/1990 | Sakurai et al. | 370/60 |
| 4,965,789 | 10/1990 | Bottau et al. | 370/79 |
| 5,018,142 | 5/1991 | Simcoe et al. | 370/112 |

Primary Examiner—Douglas W. Olms
Assistant Examiner—Melvin Marcelo
Attorney, Agent, or Firm—Sughrue, Mion, Zinn, Macpeak & Seas

[57] ABSTRACT

A frame restructuring interface for digital bit streams multiplexed by time-division multiplexing digital tributaries at different bit rates according to a synchronous multiplexing hierarchy at the various levels of which tributaries are constituted entities called containers and entities called multiplexing units. The interface includes a circuit for extracting from incoming frames the signals constituting the containers to be processed, and a circuit for constituting and for multiplexing into restructured frames subdivided into sections of the same length restructured multiplexing units, by inserting the signals together with indexing and justification signals for adapting their extraction and insertion timing rates at locations which for a given container to be processed have within each restructured frame section ranks defined relative to the start of the section, the ranks being invariant from one frame section to another and from one frame to another, and each set of the ranked locations of the restructured frame sections being assigned to at most one restructured multiplexing unit.

8 Claims, 17 Drawing Sheets

FIG. 9E
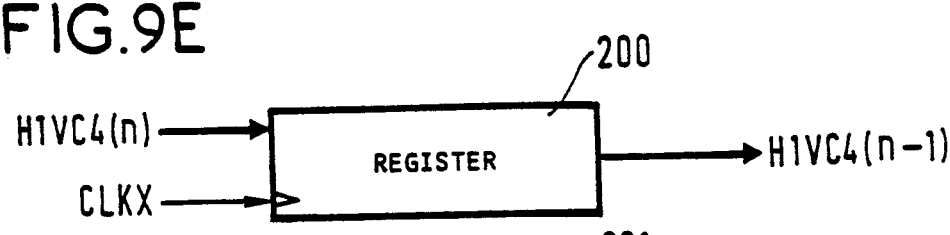
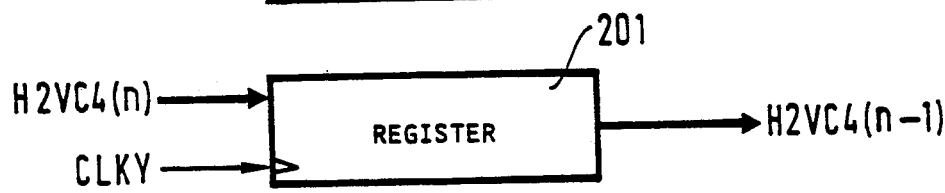
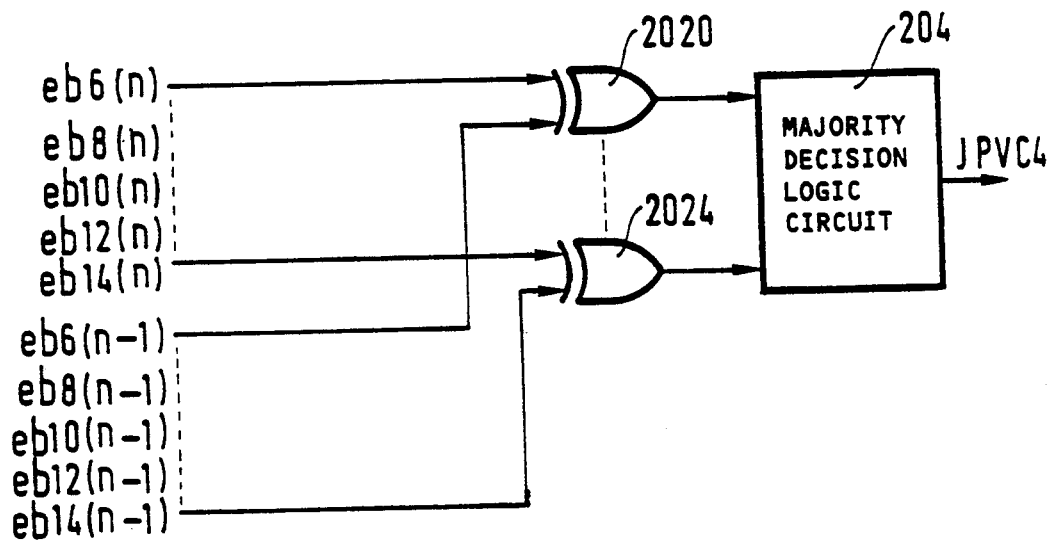
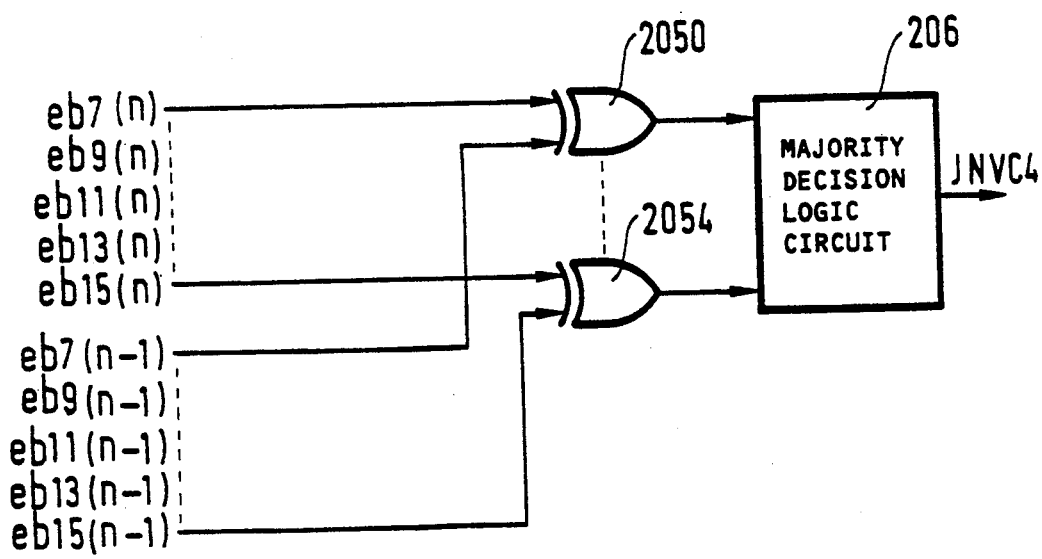
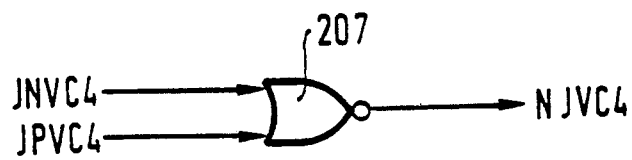

FRAME RESTRUCTURING INTERFACE FOR DIGITAL BIT STREAMS MULTIPLEXED BY TIME-DIVISION MULTIPLEXING DIGITAL TRIBUTARIES WITH DIFFERENT BIT RATES

BACKGROUND OF THE INVENTION

1. Field of the invention

The present invention concerns digital telecommunications. It is more particularly concerned with digital telecommunication systems in which the multiplexed digital bit streams transmitted are obtained by synchronous time-division multiplexing of digital tributaries at different bit rates according to a synchronous multiplexing hierarchy such as that specified in CCITT Recommendations G.707, G.708 and G.709.

2. Description of the Related art

The principle of this kind of multiplexing hierarchy is outlined in FIG. 1. The bit rates that can be multiplexed using this hierarchy are the bit rates standardized by the CCITT and shown in the righthand part of the figure: 2 048 kbit/s, 8 448 kbit/s, 34 368 kbit/s, 1 544 kbit/s, 6 312 kbit/s, 44 736 kbit/s, and 139 264 kbit/s.

There are various possible multiplexing structures for this multiplexing hierarchy depending on the bit rate of the tributaries to be multiplexed for a given application, and each multiplexing structure, such as that shown in bold line in the figure, corresponding to tributaries to be multiplexed with bit rates of 1 554 kbit/s, 2 048 kbit/s, 8 448 kbit/s and 34 368 kbit/s, comprises a number of hierarchy levels designated N1, N2, N3 in the example in question, going from the righthand part of the figure towards the lefthand part, i.e. in the direction in which the frames are formed from the various tributaries.

Tributaries can be introduced at the various hierarchy levels of a multiplexing structure and comprise entities referred to hereinafter as containers and entities referred to hereinafter as multiplexing units.

In what follows the terms container and multiplexing unit are used generically for sequences of entities and for individual elements within the sequences.

The multiplexing units constituted at a given hierarchy level and designated TU or AU (TU11, TU12, TU22 for level N1, TU31 for level N2 and AU4 for level N3 in this example) are formed by adding to the containers constituted at the same hierarchy level signals for indexing and justifying these containers relative to these multiplexing units.

The containers constituted at a given hierarchy level and designated VC (VC11, VC12, VC22 for level N1, VC31 for level N2 and VC44 for level N3 in this example) are formed by adding service signals, either to multiplex signals resulting from the multiplexing of "n" multiplexing units constituted at a lower hierarchy level, or to so-called information signals sampled on a tributary introduced at the level n question, designated C (C11, C12, C22 for level N1 and C31 for level N2 in this example).

FIG. 2 is a schematic showing the formation of the various containers or multiplexing units in the case of the multiplexing structure taken previously as an example. A container VC4 constituted at level N3 is obtained by multiplexing signals from four multiplexing units TU31a, TU31b, TU31c, TU31d constituted at level N2.

Two of these multiplexing units (TU3a and TU31b) are formed from containers VC31a and VC31b in turn formed from 34 358 kbit/s tributaries C31a and C31b introduced at level N2.

The other two multiplexing units (TU31c and TU31d) are formed from containers VC31c and VC31d in turn formed from multiplexing units TUG22 constituted at level N1 and which merely multiplex multiplexing units already constituted at the same hierarchy level, without adding indexing and justification signals.

The container VC31c is formed from four multiplexing units TUG22a, TUG22b, TUG22c, TUG22d in turn formed from four multiplexing units TU22a, TU22b, TU22c, TU22d, in turn formed from four containers VC22a, VC22b, VC22c, VC22d in turn formed from four 8 448 kbit/s tributaries C22a, C22b, C22c, C22d. The container VC31d is formed by multiplexing four multiplexing units TUG22e, TUG22f, TUG22g, TUG22h of which the first two (TUG22e and TUG22f) are formed like the multiplexing units TUG22a, TUG22b, TUG22c, TUG22d from 8 448 kbit/s tributaries C22e and C22f.

The third multiplexing unit TUG22g is formed from five multiplexing units TU11a, TU11b, TU11c, TU11d, TU11e respectively formed from containers VC11a, VC11b, VC11c, VC11d, VC11e in turn formed from five respective 1 544 kbit/s tributaries C11a, C11b, C11c, C11d, C11e.

The fourth multiplexing unit TUG22h is formed from four multiplexing units TU12a, TU12b, TU12c, TU12d respectively formed from containers VC12a, VC12b, VC12c, VC12d in turn formed from respective 2 048 kbit/s tributaries C12a, C12b, C12c, C12d.

The multiplexing unit constituted at the highest hierarchy level, which is the multiplexing unit AU4 in this example, is obtained by adding justification and indexing signals to the container constituted at this level, which is the container VC4 in this example.

The resulting STM frames are obtained by adding service signals to the multiplexing units constituted at the highest hierarchy level.

The diversity of the bit rates of the tributaries which form the frames resulting from such synchronous hierarchical multiplexing is reflected in the fact that the tributaries have within the resulting frames different information signal repetition periods, each of these periods being inversely proportional to the bit rate of the tributary. This repetition period is obtained by forming the product of the multiplexing factors "n" encountered all along the multiplexing structure for the tributary concerned. To give an example, the repetition period for the 2 048 kbit/s tributaries C12 is 64, that for the 1 544 kbit/s tributaries C11 is 80, that for the 8 448 kbit/s tributaries C22 is 16, and that for the 34 368 kbit/s tributaries C31 is 4.

The justification signals added to containers at a given hierarchy level to constitute multiplexing units provide for adapting the timing of the signals forming the containers to the timing of a local clock used at this hierarchy level, using the known positive-negative justification technique whereby a signal of a container is periodically substituted for a stuff signal provided for this purpose in the multiplexing unit formed from this container if the former timing is faster than the latter timing and a stuff signal is substituted periodically for a container signal if the former timing is slower than the latter timing.

The indexing signals produced at the various hierarchy levels serve to distribute to containers of lower levels the justification operations applied to containers of higher levels, to allow for the synchronous multiplexing effected at the various levels of the multiplexing hierarchy. In particular, they make it possible to situate each container constituted at a particular hierarchy level relative to the corresponding multiplexing unit constituted at this level, allowing for justification operations applied to this container for a given frame and for earlier frames. Also, they have a specific position within the corresponding multiplexing unit and consequently within the corresponding container constituted at the next higher hierarchy level, which (by successive recourse to the indexing signals produced at the various hierarchy levels encountered on running through the multiplexing structure in the direction opposite the direction in which the frames are formed from the tributaries) makes it possible to identify the container in question within the frames The service signals added to the multiplexing units constituted at the highest hierarchy level in order to constitute the frames are located at repetitive positions within these frames, leading to the conventional representation of these frames in the form of tables or matrices having in practice nine lines numbered 0 through 8 and 270 columns numbered 0 through 269, reading from left to right and from top to bottom, that is say, line by line, each intersection between a line and a column representing a signal (a service signal, a justification signal, an indexing signal or an information signal) consisting in practice of one byte.

FIG. 3 shows a frame of this kind in the case of the example previously discussed where the highest hierarchy level is the level N3.

The shaded area in FIG. 3 contains the service signals SOH added to a multiplexing unit AU4 to constitute a frame and the unshaded area contains a multiplexing unit AU4.

A multiplexing unit AU4 is made up of a container VC4 to which are added indexing signals H1VC4 and H2VC4 which are always present and justification signals of which the signals H30VC4, H31VC4 and H32VC4 are always present except in the case of negative justification and of which the others (no reference symbols) are present only in the case of positive justification. The indexing signals H1VC4 and H2VC4 and, when they are present, the justification signals H30VC4, H31VC4 and H32VC4, respectively occupy columns 0, 3, 6, 7 and 8 of line 3; when present, the positive justification signals occupy columns 9, 10 and 11 of line 3.

Indexing signals H1VC4 and H2VC4 identify a container VC4 within a multiplexing unit AU4 and therefore within a frame, in practice by identifying the first byte of the container VC4, marked Δ in FIG. 3.

FIG. 4 shows the position of a container VC4 within a given frame "m" and the next frame "m+1" (into which it overlaps by the very nature of the indexing signals and by virtue of the location of these indexing signals in line 3 of the frames, as shown in FIG. 3), the space occupied by the container VC4 being shaded. The content of a container VC4 is represented in FIG. 5 in the form of a table with nine lines and 261 columns, also read from left to right and from top to bottom; if there is no justification of the container VC4 relative to the multiplexing unit AU4, this table fits perfectly into the frame shown in dashed outline in FIG. 4, formed by the bytes in columns 9 through 269 of lines 3 through 8 of frame "m" and 0 through 2 of frame "m+1".

In practice the shape of the container VC4 departs from this nominal shape because of positive or negative justification applied to the container for earlier frames and up to the current frame "m", represented by a shifting of the first byte of the container VC4 (indicated by the bytes H1VC4 and H2VC4 of frame "m") and because of any justification applied to the container for frame "m+1". FIG. 4 shows the case where positive justification is applied to the container for frame "m+1", which justification (indicated by the bytes H1VC4 and H2VC4 of frame "m+1") is reflected in the insertion of stuff bits in columns 9 through 11 in line 3 of frame "m+1".

In the case of negative justification applied to frame "m+1", again indicated by bytes H1VC4 and H2VC4 of frame "m+1", container VC4 would not have, as shown in FIG. 4, a part indented by three bytes in line 3 of frame "m+1" but would protrude by three bytes on this same line at the level of columns 6 through 8, this negative justification being applied by setting the bytes of VC4 at the location of bytes H30VC4, H31VC4 and H32VC4 (negative justification opportunity bytes of frame "m+1").

The container VC4 in question is formed by multiplexing four multiplexing units TU31a, TU31b, TU31c, TU31d occupying the unshaded area in FIG. 5 and by adding service signals POHVC4 occupying the shaded area, that is to say the first or lefthand column of the table with nine lines and 261 columns. Each multiplexing unit (TU31a, for example) is in turn formed by adding to a container (VC31a in this example) indexing signals H1VC31a and H2VC31a and justification signals of which one (H3VC31a) is provided to give a negative justification opportunity and is always present except in the case of negative justification; another (not shown) is present only in the case of positive justification. The indexing and justification signals of the four VC31 containers are at a specific position relative to the first byte of the container VC4 and can therefore be identified once the latter has been identified, so that these containers can be identified, in practice by identifying the location of the first byte, respectively designated Δa, Δb, Δc, Δd.

The various VC31 containers (VC31a, VC31b, VC31c, VC31d) are also shown in FIG. 6, again in the context of the multiplexing structure being discussed by way of example, each of them being formed by adding service signals POHVC31a, POHVC31b, POHVC31c, POHVC31d either to multiplexed multiplexing units TUG22 or to signals from a tributary C31, as appropriate. Each of the VC31 containers can be represented, as shown in FIG. 6, in the form of a table read from left to right and from top to bottom, comprising nine lines and 65 (=260/4) columns, of which the first, which contains the service signals, is incomplete; the number of signals needed to complete it is equal to the number of indexing and justification signals attached to each VC31 container in the absence of positive and negative justification to constitute the corresponding TU31 multiplexing unit.

It would be possible to show the containers of lower hierarchy levels in a similar way, in other words in the form of a table having nine lines and a number of columns depending on the hierarchy level, and decreasing with the hierarchy level, some columns being incomplete.

Because of the indexing and justification operations applied successively to the various hierarchy levels the position within the frames of signals constituting given containers is not predetermined but can be determined, ignoring for the moment the complexity of the resulting processing, from the indexing signals of the containers concerned and of the containers of higher hierarchy levels.

For the same reasons, and because of the insertion of indexing, justification and service bytes within the frame, and because of the correlation between the number of elementary locations per lines that can be occupied by signals constituting a highest hierarchy level container and the number of multiplexing units of the next lower level multiplexed to form this highest level container, and because of the correlation between the number of justification bytes used at each hierarchy level and the number of multiplexing units that can be multiplexed at this level, the elementary locations assigned to signals constituting given containers are not reproducible from one line to the next of the frames, which is a very important drawback for equipment for processing such digital bit streams in the form of containers.

One object of the present invention is an interface for restructuring frames for such equipments enabling these disadvantages to be avoided.

SUMMARY OF THE INVENTION

The present invention consists in a frame restructuring interface for digital bit streams multiplexed by time-division multiplexing digital tributaries at different bit rates according to a synchronous multiplexing hierarchy at the various levels of which tributaries can be introduced and constituted by entities called hereinafter containers and entities called hereinafter multiplexing units, the multiplexing units being formed by adding justification and indexing signals to containers constituted at the same hierarchy level and the containers being formed as appropriate either of multiplex signals obtained by multiplexing lower hierarchy level multiplexing units or signals from tributaries, said frames being formed by adding service signals either to the multiplexing units constituted at the highest hierarchy level or to a multiplex signal of lower hierarchy level multiplexing units, said interface being intended for equipment for processing said frames by containers referred to hereinafter as containers to be processed and comprising means for extracting from the incoming frames the signals constituting said containers to be processed and means for constituting and for multiplexing into restructured frames subdivided into sections of the same length restructured multiplexing units respectively representing said containers to be processed, by inserting signals constituting said containers to be processed and indexing and justification signals for adapting their extraction and insertion timing rates at locations which for a given container to be processed have within each restructured frame section ranks defined relative to the start of the section, said ranks being invariant from one frame section to another and from one frame to another and each set of same ranked locations of said restructured frame sections being assigned to at most one restructured multiplexing unit.

The objects and characteristics of the present invention will emerge more clearly from the following description of one embodiment given with reference to the appended diagrammatic drawings.

BRIEF DESCRIPTION OF THE DRAWINGS

The invention will be more clearly understood from the following detailed description in conjunction with the accompanying drawings, wherein:

FIGS. 9A through 9E and FIG. 10 respectively show a VC31 container indexing signal detector circuit, a timing diagram for it, a diagram showing the constitution of indexing bytes H1VC4 and H2VC4 and a schematic showing the principle of identifying the first byte of a VC4 container.

DETAILED DESCRIPTION OF THE INVENTION

First consider, by way of example, the case where the containers to be processed are VC31 containers, which can occur with the multiplexing structure considered previously as an example.

The restructuring of the incoming frames begins with the extraction from these frames of the signals or bytes constituting the VC31a, VC31b, VC31c, VC31d containers, which first requires identification of the first byte of these containers in these frames. This identification entails identifying indexing signals of higher level (VC4) containers, which enables identification of the first byte of these VC4 containers, and additionally, the VC31 container indexing signals being at specific positions within the VC4 containers so identified, identification of the latter indexing signals, which in turn enables identification of the first byte of each VC31 container.

Figure 7:
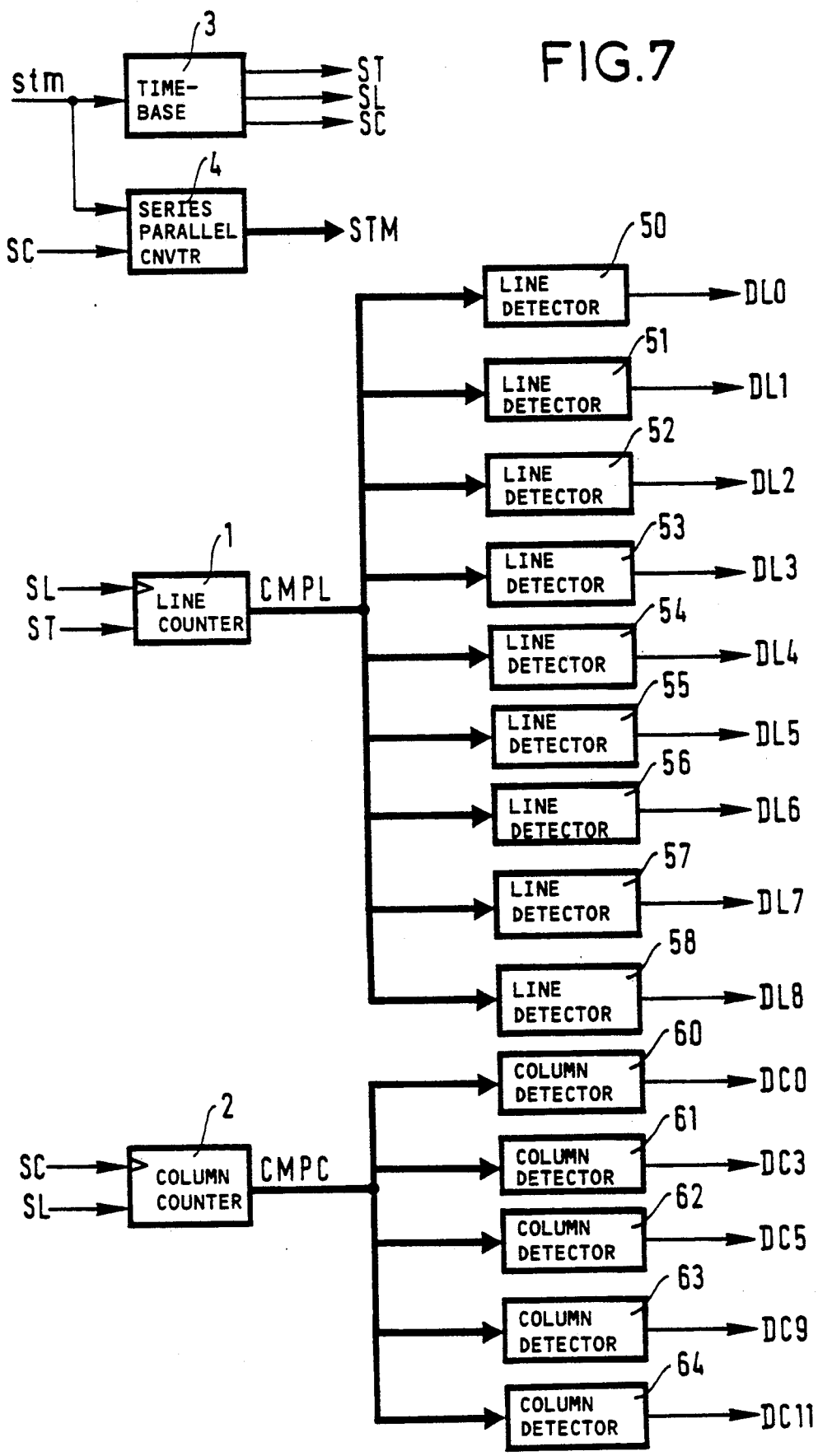
FIG. 7 shows a number of elements common to various circuits used in an interface in accordance with the invention.

The circuits which perform the identification function have a number of elements in common, these being shown in FIG. 7. They include a line counter 1 which counts from 0 through 8 and is incremented by an incoming frame's line synchronization signal SL and which is reset to 0 by an incoming frame's frame synchronization signal ST and a column counter 2 which counts from 0 through 269 and is incremented by an incoming frame's column synchronization signal SC and is reset to 0 by the incoming frame's line synchronization signal SL.

The counters 1 and 2 supply on a number of parallel lines (represented by the bold lines) respective signals CMPL and CMPC indicating their respective count states.

The signals ST, SL and SC are obtained from a time-base 3 which receives at its input the incoming frames in serial form stm.

The incoming frames in parallel form STM, which are in the form of successive 8-bit words or bytes, are obtained at the output of a series-parallel converter 4 controlled by the column (i.e. byte) synchronization signal SC and receiving at its input the incoming frames in serial form.

FIG. 7 also shows circuits 50 through 58 for detecting lines 0 through 8 of the incoming frames and supplying respective signals DL0 through DL8 and circuits 60 through 64 for detecting columns 0, 3, 5, 9 and 11 of the incoming frames and supplying respective signals DC0, DC3, DC5, DC9, DC11.

These circuits simply decode the states of counters 1 and 2; their output signals are logic signals representing logic .1 if the lines or columns concerned are in the incoming frame and logic "0" otherwise.

Figure 8A:
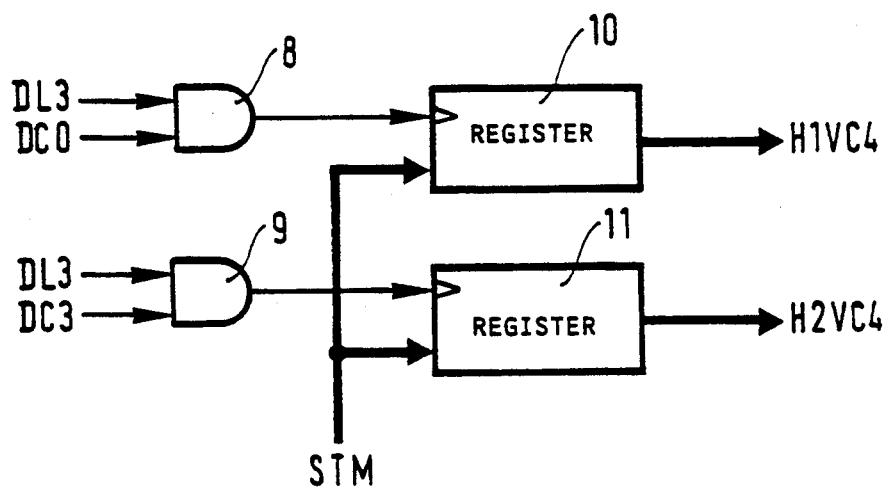
FIGS. 8A and 8B respectively show a VC4 container indexing signal detector circuit and its timing diagram.

The process for detecting the indexing signals H1VC4 and H2VC4 of the VC4 container will now be described with reference to FIG. 8A showing the circuit used and FIG. 8B which is a timing diagram for this circuit.

Indexing signals H1VC4 and H2VC4 are respectively in columns 0 and 3 of line 3 of the incoming frames and this circuit therefore comprises an "AND" gate 8 for detecting coincidence of the "3" state of the line counter and the "0" state of the column counter and an "AND" gate 9 for detecting coincidence of the "3" state of the line counter and the "3" state of the column counter, the gates 8 and 9 being respectively connected to receive signals DL3 and DC0 and signals DL3 and DC3.

The logic signals at the outputs of the "AND" gates 8 and 9 are applied to respective rising edge triggered clock inputs of two registers 10 and 11 which receive on their respective data inputs the incoming STM frames and in which the H1VC4 and H2VC4 bytes are respectively stored when they appear in the incoming frames.

Figure 8B:
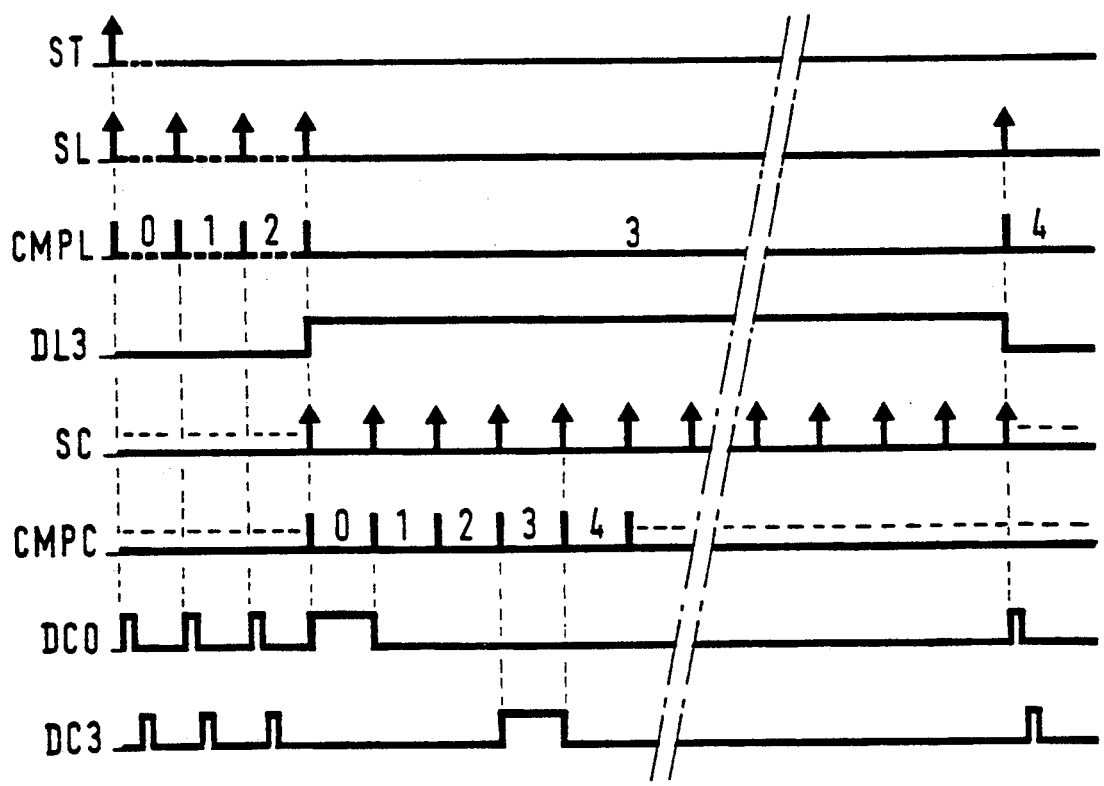

FIG. 8B is a timing diagram for the signals ST, SL, CMPL, DL3, SC, CMPC, DC0 and DC3. To make this diagram easier to read, the time scale has been expanded for the "3" state of the counter 1 output signal CMPL.

The process for detecting the VC31a, VC31b, VC31c, VC31d container indexing signals will now be described. The process is similar for all four VC31 containers and that for one container only (VC31a) will now be described with reference to FIGS. 9A, 9B and 9E showing the detector circuit and FIGS. 4 and 5, previously described and respectively showing the location of the VC4 container in the incoming frames and the constitution of a VC4 container, and additionally with reference to FIG. 9C which is a timing diagram, FIG. 9D which shows the composition of the indexing bytes H1VC4 and H2VC4, and FIG. 10 which shows the principle of detecting the first byte of a VC4 container.

Figure 4:
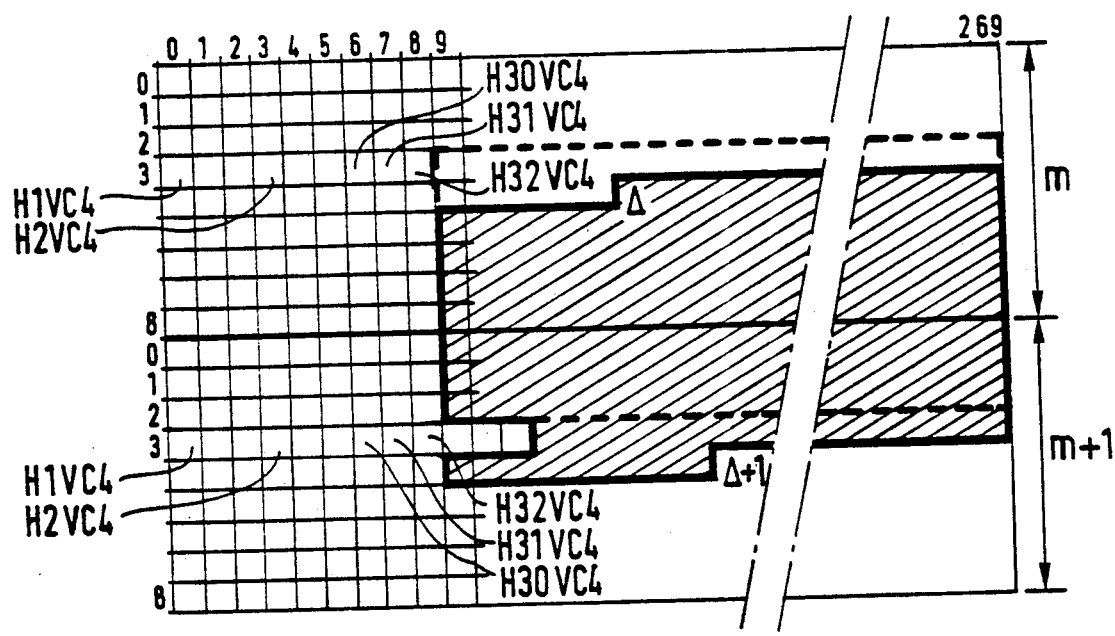
FIG. 4 is a diagram showing the position of a container VC4 within a given frame "m" and a next frame "m+1".

The indexing bytes H1VC4 and H2VC4 identify the position of the first byte of the VC4 container within the rectangle shown in dashed outline in FIG. 4. In more precise terms, they identify one of 783 possible locations, shown shaded in FIG. 10 and spaced by three bytes, the VC4 containers being justified by three bytes, whether this is negative or positive justification. The value given by these indexing signals is designated $\Delta VC4$, and is between 0 and 782.

Figure 5:
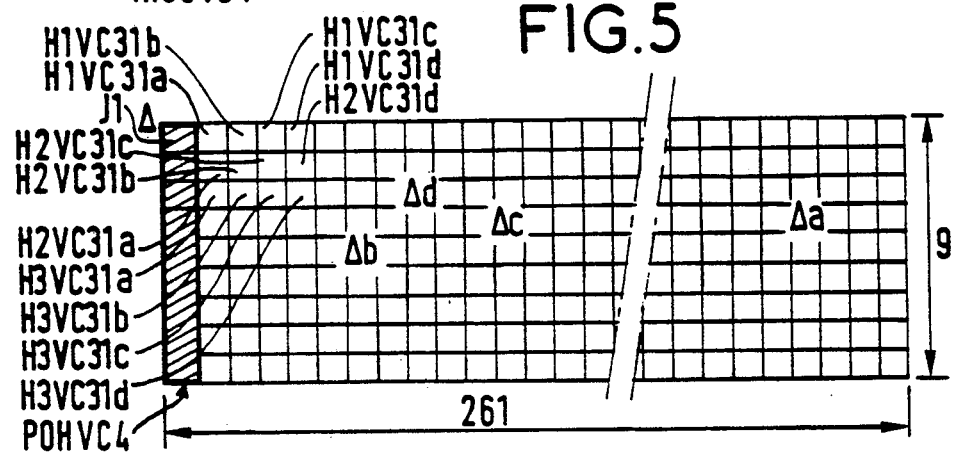
FIG. 5 is a diagram showing the content of a container VC4.
Figure 6:
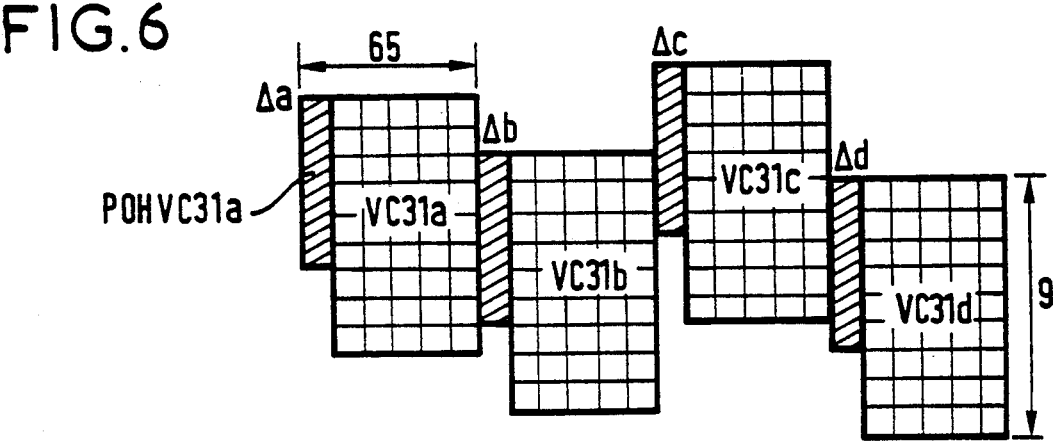
FIG. 6 is a diagram illustrating containers VC31a, VC31b, VC31c and VC31d.

The first byte of a VC4 container is the first POHVC4 service byte J1, as shown in FIG. 5. This byte J1 is immediately followed by the byte H1VC31a, the first indexing byte of the VC31 container. The second VC31a container indexing byte H2VC31a is in the VC4 container at the location which is a fixed number of bytes after H1VC31a, in this instance 261 bytes (this is the width of the dashed outline rectangle in FIG. 4).

Figure 9A:
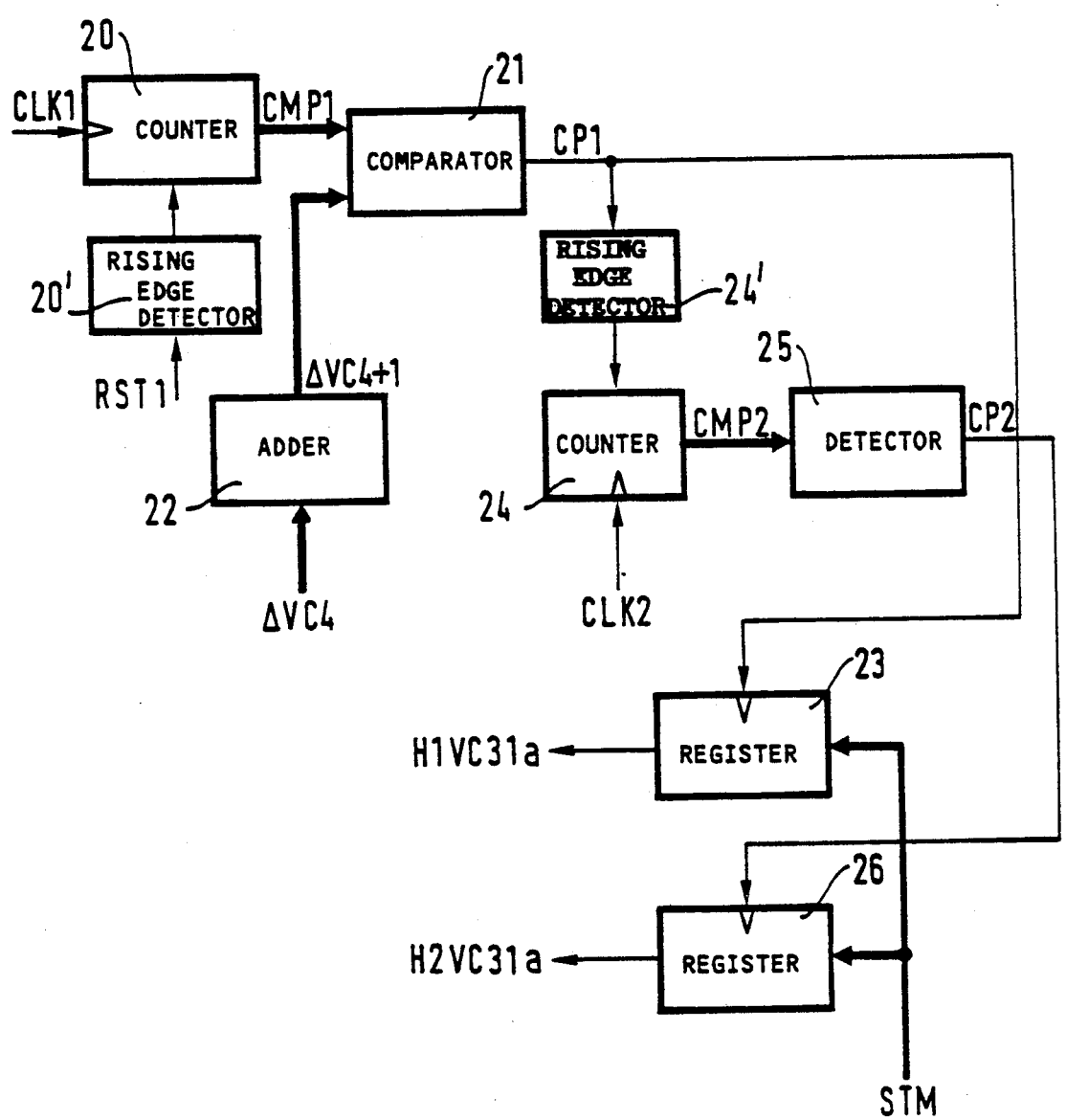
Figure 9B:
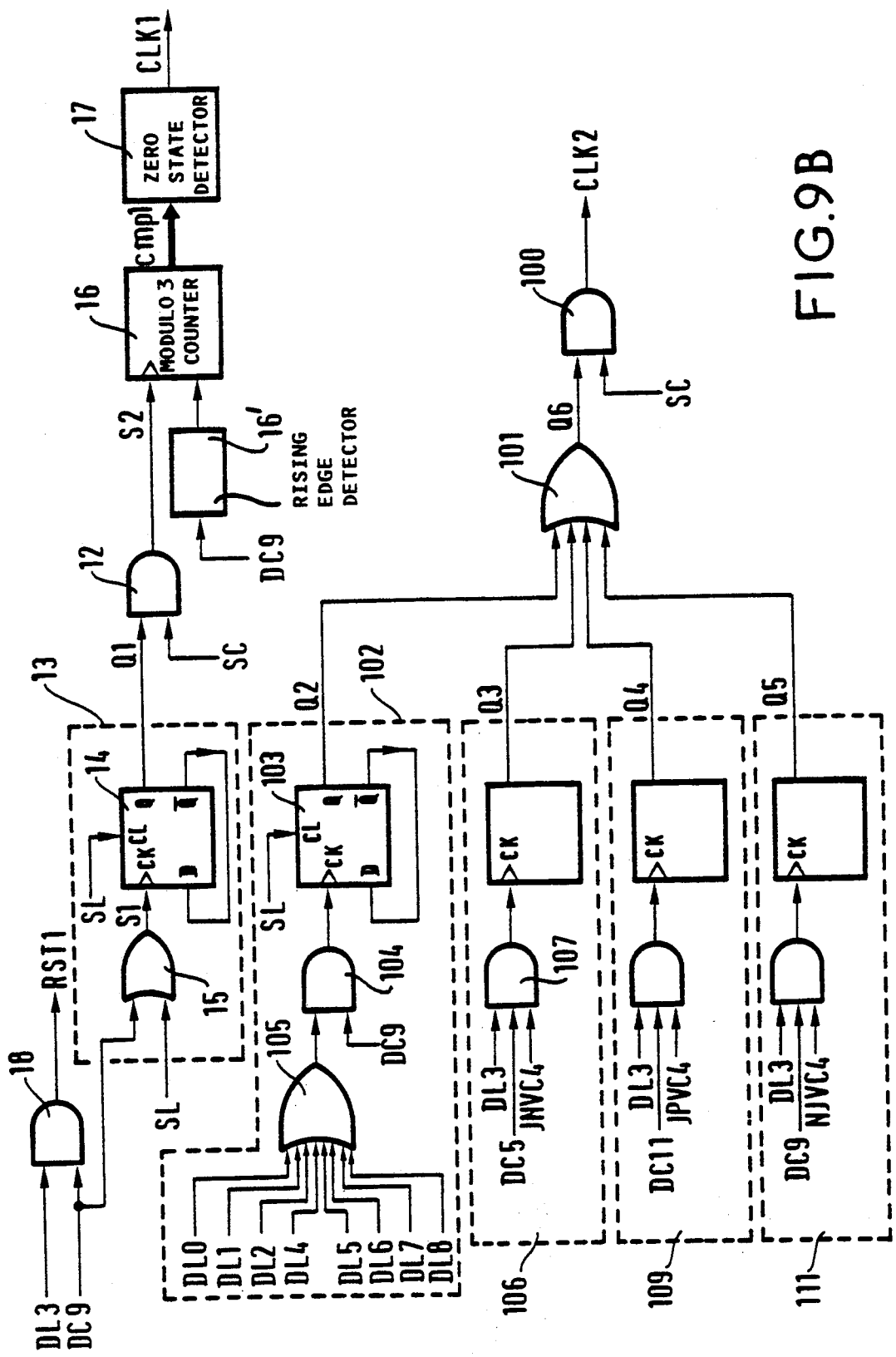
Figure 10:
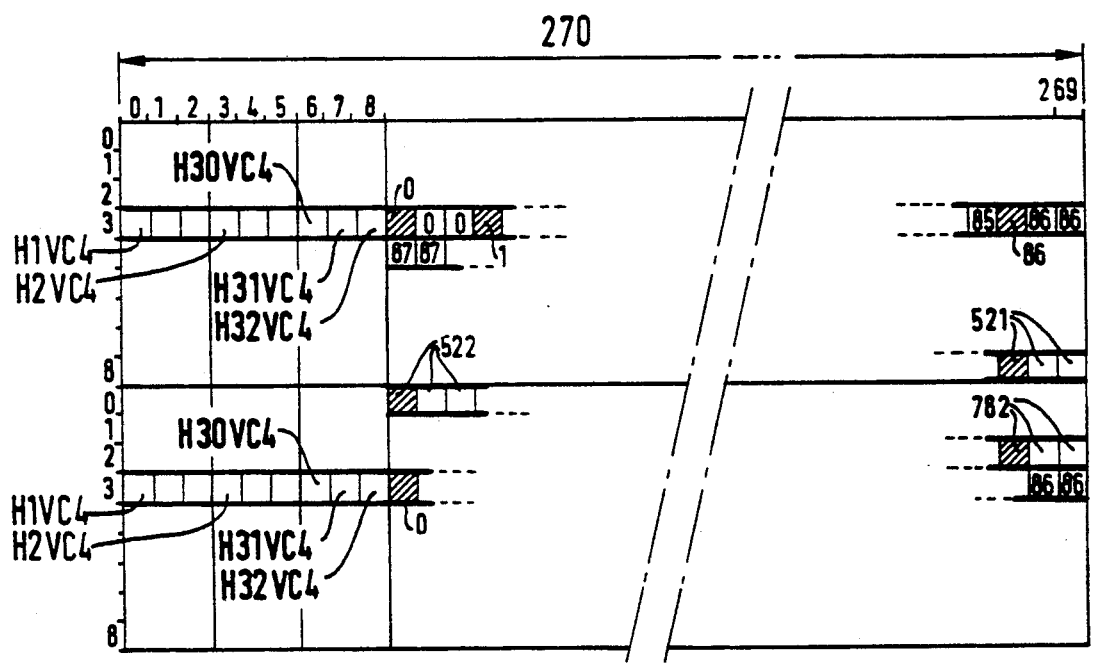

As shown in FIG. 9A, the H1VC31a byte detector circuit comprises a counter 20 which is reset to 0 via a rising edge detector 20' by a signal RST1 in line 3, column 9 of the incoming frames, that is immediately after the location reserved for the H32VC4 justification signal, and incremented by a clock signal CLK1 obtained from the incoming frame column synchronization signal by blocking transitions of the latter during the first nine elementary locations or byte-times of each line and acting on only one in three of the transitions isolated in this way. The values that this counter can take are the values 0 through 782 shown in FIG. 10.

The output signal CMP1 of the counter 20 is applied to a comparator 21 which also receives the value $\Delta VC4+1$ from an adder 22 which adds the value "1" to the value $\Delta VC4$. If the value of the counter 20 reaches $\Delta VC4+1$, this means that the H1VC31a byte location is in the frame. This byte is stored in a register 23 whose rising edge triggered clock input receives the output signal CP1 from the comparator 21, which has a rising edge at the time in question, and whose data input receives the incoming frames STM.

At this time the signal CP1 commands, via a rising edge detector 24', counting by a counter 24 which counts from 0 through 260 and latches automatically on 260. The counter 24 is incremented by a clock signal CCLK2 obtained from the incoming frame column synchronization signal SC by blocking the latter in columns 0 through 8 of lines 0, 1, 2, 4, 5, 6, 7, 8, in columns 0 through 5 of line 3 if the VC4 container is negative justified relative to the multiplexing unit AU4, in columns 0 through 11 of line 3 if the VC4 container is positive justified relative to the multiplexing unit AU4, or in columns 0 through 8 of line 3 if the VC4 container is not justified relative to the multiplexing unit AU4.

As shown in FIG. 4, the H1VC31a byte of a given frame "m" can be identified a priori in any line 3 through 8 of this frame or in any line 0 through 2 of the next frame "m+1", so the H2VC31a byte can itself be in any of lines 4 through 8 of the frame "m" or in any of lines 0 through 3 of the frame "m+1". The justification of the VC4 container to the "m+1" frame is therefore to be taken into account if line 3 of frame "m+1" is encountered during the counting performed by the counter 24.

The state of the counter 24 is indicated by its output signal CMP2. The state 260 of this counter is detected by a detector 25 supplying an output signal CP2 which has a rising edge at this time and which is applied to the rising edge triggered clock input of a register 26 which receives the STM frames on a parallel data input and responds to the arrival of the state 260 of the counter 24 by commanding the storage in the register 26 of the incoming STM frame byte occupying the corresponding location, this being the H2VC31a byte.

To detect the VC31b, VC31c and VC31d container indexing signals the values ΔVC4+2, ΔVC4+3 and ΔVC4+4 are compared with the state of the counter 20 as indicated by its output signal CMP1.

The circuits which generate the signals CLK1, RST1 and CLK2 will now be described with reference to FIG. 9B.

The circuit which generates the clock signal CLK1 includes an "AND" gate 12 for recognizing transitions of the column synchronization signal SC in columns 9 through 269 only. This gate receives the signal SC and the output signal Q1 from a circuit 13 which generates a time window extending from column 9 to column 269 of each line. Said time window is represented by a logic signal Q1 at logic "1". The circuit 13 includes a D type flip-flop 14 providing the signal Q1 on its output Q and receiving on its input D the complemented output signal $\overline{Q}$. On its clear input CL it receives the line synchronization signal SL and on its clock input CK it receives the output signal S1 from an "OR" gate 15 receiving the line synchronization signal SL and the incoming frame column 9 detection signal DC9. The signal S2 at the output of the circuit 12 is applied to the rising edge triggered clock input of a "modulo 3" counter 16 which is reset to zero by the signal DC9 through a rising edge detector 16'.

The clock signal CLK1 is obtained at the output of a circuit 17 detecting state 0 of the counter 16, the state of this counter being indicated by its output signal cmp1.

The circuit generating the signal RST1 includes an "AND" gate 18 for detecting coincidence between a line 3 and a column 9 which receives the signal DL3 and the signal DC9.

Figure 9C:
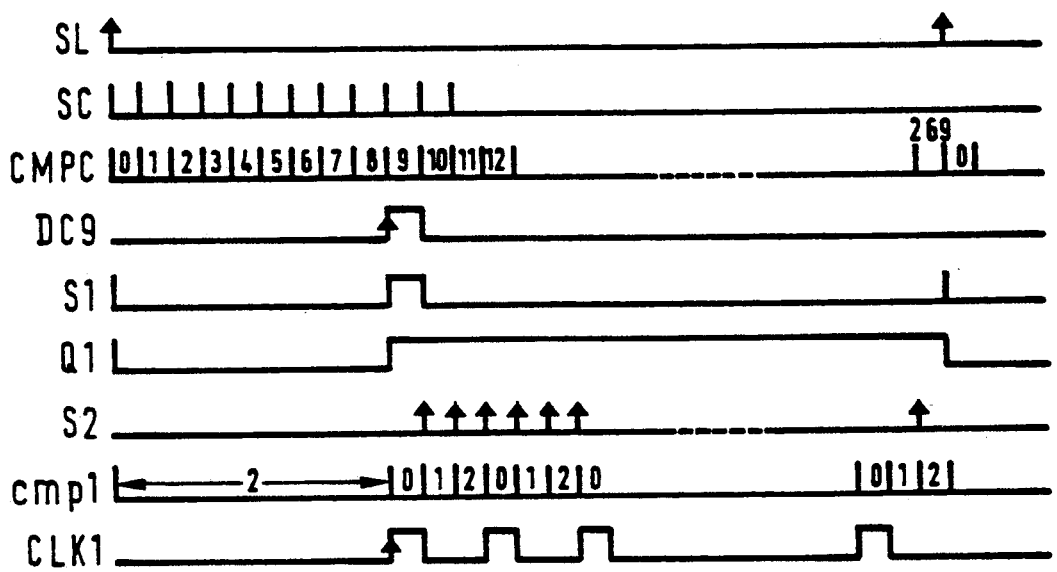

FIG. 9C is a timing diagram for these circuits.

The circuit generating the signal CLK2 includes an "AND" gate 100 for recognizing pulses of the column synchronization signal SC within a time window represented by a logic signal Q6 and extending, for lines 0 through 2 and 4 through 8 from column 9 to column 269 and for line 3 from column 6 to 269 or from column 12 to column 269 or from column 9 to column 269, depending on whether the container is negative or positive justified or not justified relative to the multiplexing unit AU4.

The corresponding time windows are represented by logic signals Q2 through Q5 at logic "1", the "AND" gate 100 receiving the column synchronization signal SC and the signal Q6 from an "OR" gate 101 receiving the signals Q2 through Q5.

The signal Q2 is obtained from a time window generator circuit 102 which includes a D type flip-flop 103 whose Q output provides a signal Q2 and whose complemented output $\overline{Q}$ is looped to the D input, the clear input CL receiving the line synchronization signal SL and the clock input CK receiving the output signal of an "AND" gate 104 receiving the column 9 detection signal DC9 and the output signal from an "OR" gate 105 receiving the signals DL0 through DL2 and DL4 through DL8 detecting lines 0 through 2 and 4 through 8.

The signal Q3 is obtained from a time window generator circuit 106 similar to the circuit 102 except that the "AND" gate 104 is replaced with an "AND" gate 107 receiving the signals DL3 and DC5 and a VC4 container negative justification detection signal JNVC4.

The signal Q4 is obtained from a time window generator circuit 109 similar to the circuit 106 except that the negative justification detection signal JNVC4 is replaced with a positive justification detection signal JPVC4.

The signal Q5 is obtained from a time window generator circuit 111 similar to the circuits 106 and 109 except that the signals JNVC4 and JPVC4 are replaced by a VC4 container non-justification detection signal NJVC4.

The circuits generating the VC4 container negative, positive and non-justification signals JNVC4, JPVC4 and NJVC4 will now be described with reference to FIGS. 9D and 9E.

Figure 9D:
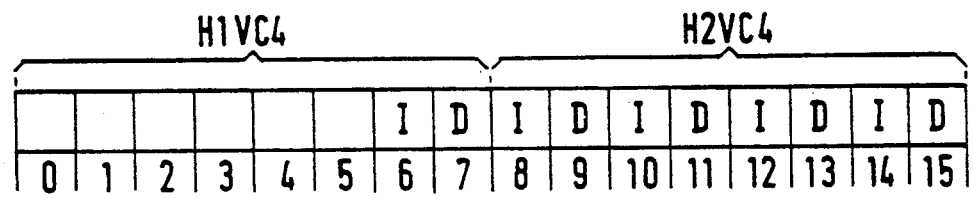

The negative/positive/no justification indication is given by bytes H1VC4 and H2VC4, the composition of which is shown in FIG. 9D, in which the bits of these bytes are numbered 0 through 7 for the H1VC4 byte and 8 through 15 for the H2VC4 byte.

The bits with the numbers 6, 8, 10, 12 and 14 (marked I) are inverted from one frame to the next to indicate positive justification.

The bits with the numbers 7, 9, 11, 13 and 15 (marked D) are inverted from one frame to the next to indicate negative justification.

Absence of inversion of the I and D bits from one frame to the next indicates the absence of justification.

FIG. 9E shows the circuits which generate the signals JNVC4, JPVC4 and NJVC4.

These circuits share two registers 200 and 201 which receive on their data inputs H1VC4(n) and H2VC4(n) bytes relating to a given frame "n", output from the registers 10 and 11 shown in FIG. 8A, the clock inputs of these registers receiving the same clock signals as the registers 10 and 11 (CLKX and CLKY). At the outputs of these registers are obtained the H1VC4(n−1) and H2VC4(n−1) bytes relating to the previous frame "n−1".

The JPVC4 signal is generated as follows: the bits with numbers 6, 8, 10, 12, 14 of the H1VC4(n) and H2VC4(n) bytes—marked eb6(n), eb8(n), eb10(n), eb12(n), eb14(n)—are respectively applied to a first input of five "exclusive-OR" gates 2020 through 2024. A second input of each "exclusive-OR" gate receives the bits with the numbers 6, 8, 10, 12, 14 of the H1VC4(n−1) and H2VC4(n−1) bytes—marked eb6(n−1), eb8(n−1), eb10(n−1), eb12(n−1), eb14(n−1). The positive justification control signal JPVC4 is obtained at the output of a majority decision logic circuit 204.

The JNVC4 signal is obtained as follows: the bits with the numbers 7, 9, 11, 13, 14, 15 of the H1VC4(n) and H2VC4(n) bytes—marked eb7(n), eb9(n), eb11(n), eb13(n), eb14(n), eb15(n)—are respectively applied to a first input of five "exclusive-OR" gates 2050 through 2054. A second input of these "exclusive-OR" gates receives the bits with the numbers 7, 9, 11, 13, 15 of the H1VC4(n−1) and H2VC4(n−1) bytes—marked eb7(n−1), eb9(n−1), eb11(n−1), eb13(n−1), eb15(n−1). The negative justification control signal JNVC4 is obtained at the output of a majority decision logic circuit 206.

The no justification control signal NJVC4 is obtained at the output of a "NOR" gate 207 receiving the signal JNVC4 and the signal JPVC4.

Figure 11:
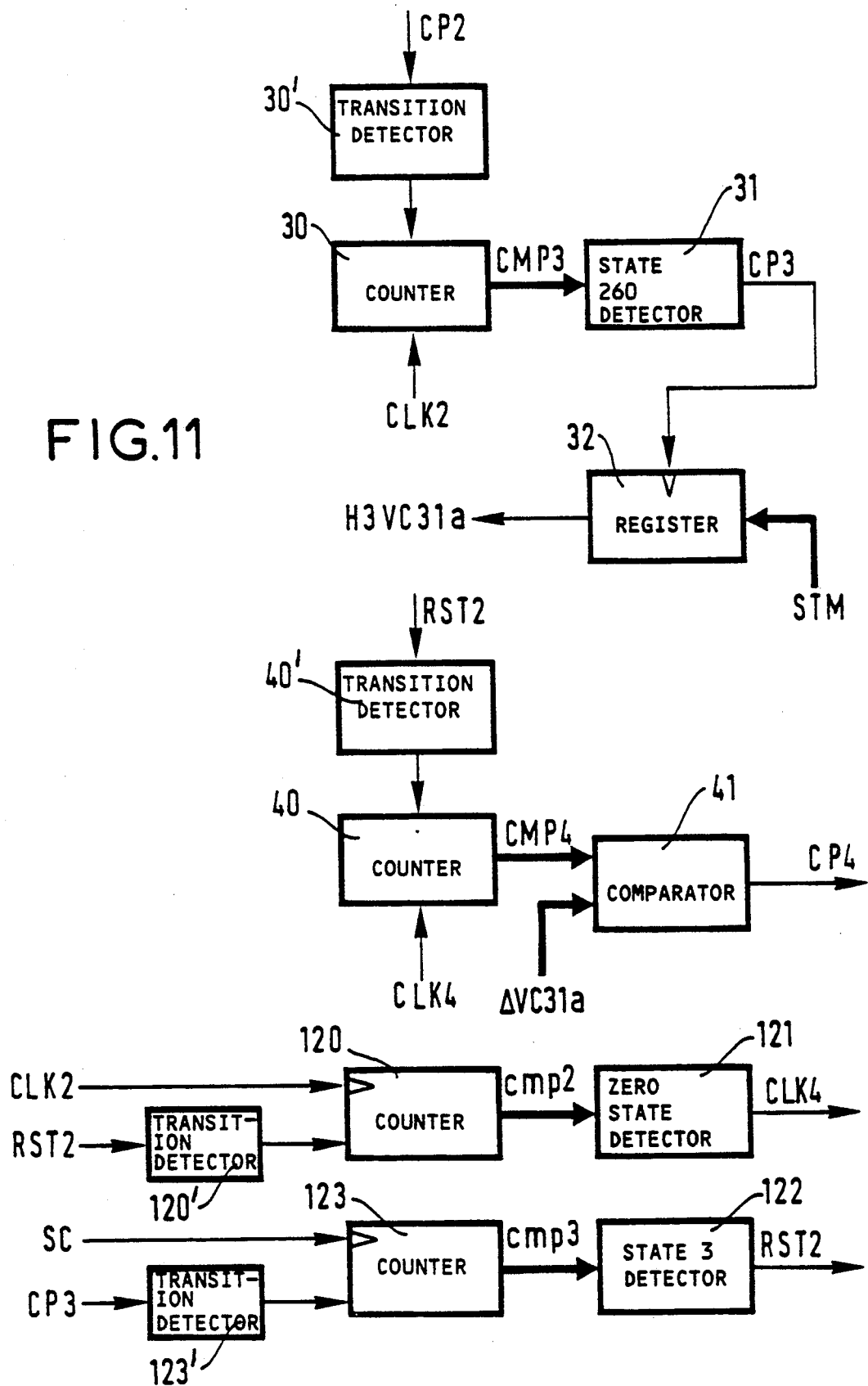
FIGS. 11 through 13 respectively show a VC31 container first byte detector circuit, a diagram showing the principle of identifying this byte and a diagram showing the space occupied by a VC31 container within two successive VC4 containers of higher level.
Figure 12:
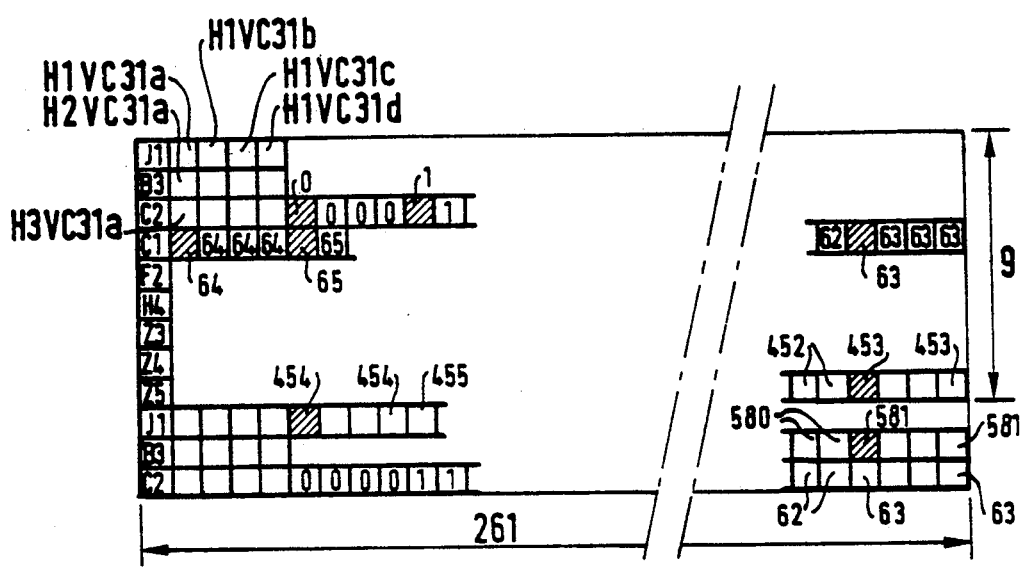
Figure 13:
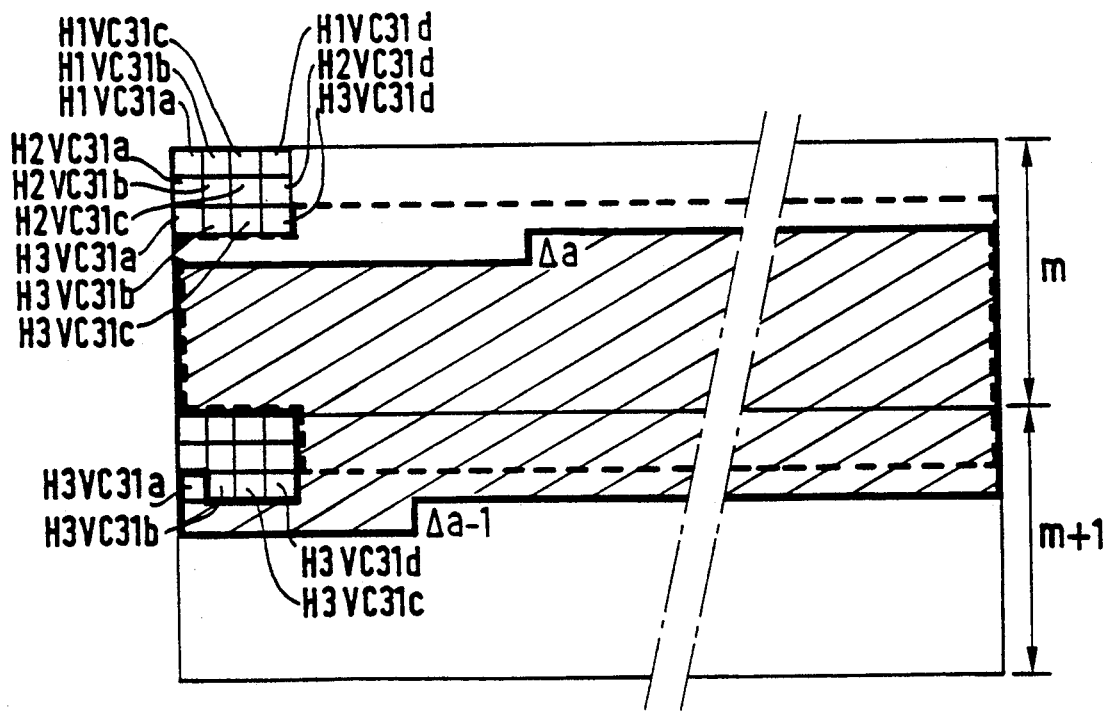

The process for detecting the first byte of the VC31a container will now be described with reference to FIG. 11 showing the circuit used, FIG. 12 showing the principle of identifying this byte and FIG. 13 showing, subject to reservations to be explained later, the space occupied by a VC31 container within two consecutive VC44 containers, of rank "m" and "m+1".

The indexing bytes H1VC31a and H2VC31a identify the position Δa of the first byte of the VC31a container within the space shown in dashed outline in FIG. 13, representing the shape of the VC31a container in the absence of any justification, ignoring the "by 4" multiplexing factor with the other containers VC31b, VC31c, VC31d, as this is difficult to show in the figure. The real space, that is to say the space allowing for the justifications, is different and shading is used to indicate an example of the space occupied by a VC31 container within two consecutive VC4 containers "m" and "m+1". In this example negative justification is applied. The indexing bytes H1VC31a and H2VC31a identify one of 582 possible locations, shown shaded in FIG. 12 and spaced by four bytes to allow for the multiplexing of four VC31 containers and for the justification of the VC31 containers by a single byte. ΔVC31a denotes the value (between 0 and 581) indicated by these indexing signals.

When the H1VC31a and H2VC31a bytes have been detected, the VC31a container justification byte H3VC31a is detected using a counter 30 identical to the counter 24 and operating in the same way, except that it is controlled by the output signal CP2 from the detector circuit 25 through a given direction transition detector 30', so that it begins to count from 0 to 260 when the H2VC31a byte is detected, the H3VC31a byte being situated 261 bytes after the H2VC31a byte, and by means of a circuit 31 detecting the state 260 of this counter, the output signal CP3 of which, when the counter 30 reaches the 260 state, commands the storage of the corresponding H3VC31a byte of the incoming frames STM in a register 32 receiving on its parallel data input the STM frames and on its clock input the signal CP3.

When the H1VC31a, H2VC31a and H3VC31a bytes have been identified, the first byte of the VC31a container is detected using a counter 40 which is reset through a given direction transition detector 40' by a signal RST2 for byte-times after the detection of the H3VC31a byte and which is incremented by a clock signal CLK4 obtained from the incoming frame column synchronization signal SC by blocking transitions of the latter in columns 0 through 8 for lines 0 through 2 and 4 through 8, in columns 0 through 5 for line 3 if the VC4 container is negative justified relative to the multiplexing unit AU4, in columns 0 through 11 for line 3 if the VC4 container is positive justified relative to the multiplexing unit AU4, or in columns 0 through 9 for line 3 if the VC4 container is not justified relative to the multiplexing unit AU4 and by ignoring three out of four of the transitions thus isolated. The values that this counter can take are the values 0 through 581 shown on FIG. 12.

The output signal CMP4 of the counter 40 is applied to a comparator 41 which receives also the value VC31a. When the state of the counter 40, as indicated by its output signal CMP4, reaches this value, this means that the corresponding location is that occupied by the first byte of the VC31a container. The output signal CP4 of the comparator 41 has a transition at this time.

The circuit generating the clock signal CLK4 and the signal RST 2 will now be described.

The signal CLK2 is applied to the clock input of a counter 120 which divides by four and which is reset via a given direction transition detector 120' by the signal RST2. The output signal cmp2 of the counter 120 is applied to a circuit 121 detecting the zero state of this counter. The clock signal CLK4 is obtained at the output of the circuit 121.

The signal RST2 is obtained at the output of a circuit 122 detecting state 3 of a counter 123 which latches automatically at 3, the count state of this counter being indicated by its output signal cmp3. This counter is incremented by the column synchronization signal SC and cleared by the signal CP3 through a given direction transition detector 123'.

Figure 15:
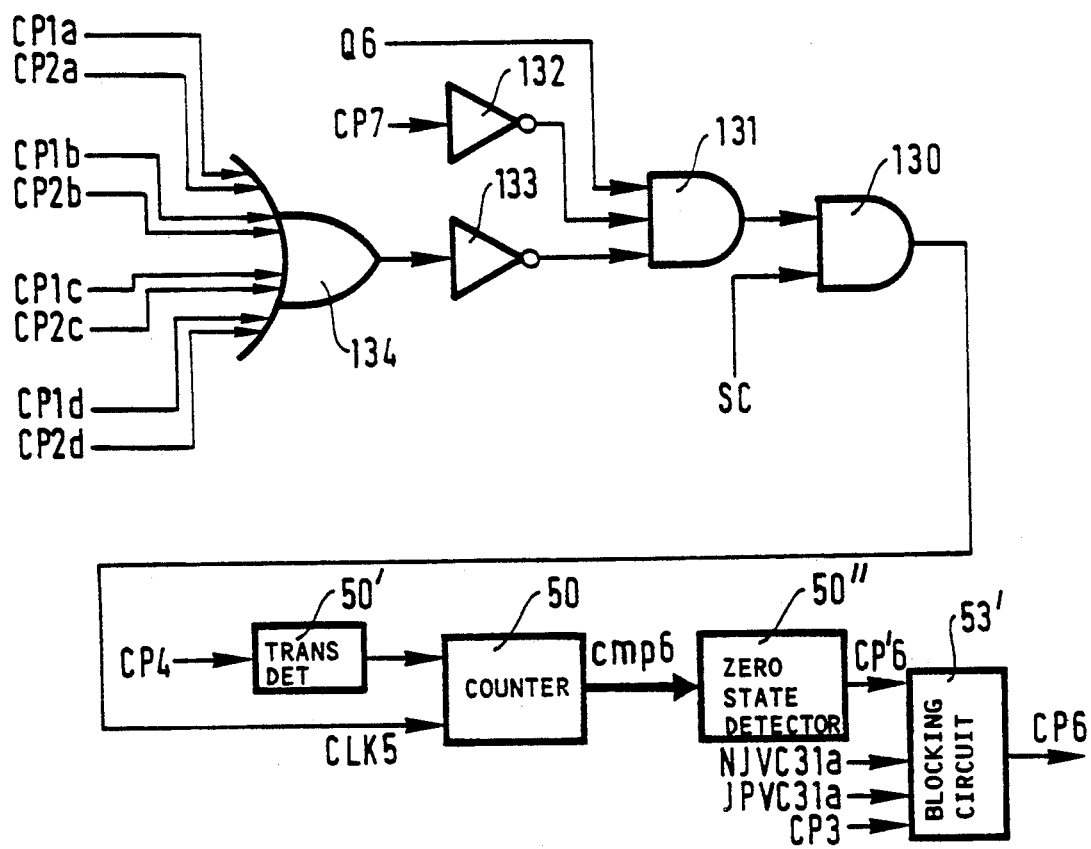
FIG. 15 is a diagram of a circuit for detecting bytes of a VC31 container to be processed, other than the first of said bytes, which is detected as in FIG. 11.

When the first byte of the VC31a container has been identified the subsequent bytes of this container are identified, as shown in FIG. 15, using a counter 50 which is cleared through a given direction transition detector 50' by the signal CP4 on detection of the first byte of the VC31a container and counting "modulo 4" at the timing rate of a clock signal CLK5 obtained from the incoming frame column synchronization signal SC by blocking this, in order to ignore bytes other than those constituting the VC31a container:

during columns 0 through 8 of lines 0 through 2 and 4 through 8 of the incoming frames, during columns 0 through 5 of line 3 of the incoming frames if the VC4 container is negative justified relative to the multiplexing unit AU4, during columns 0 through 11 of line 3 of the incoming frames if the VC4 container is positive justified relative to the multiplexing unit AU4, during columns 0 through 8 of line 3 of the incoming frames if the VC4 container is not justified relative to the multiplexing unit AU4, during the bytes constituting the POHVC4 service signals, during the H1VC31 and H2VC31 indexing bytes of the four VC31 containers.

The subsequent bytes of the VC31a container are detected by means of a circuit 50" for detecting changes to the "zero" state of the counter 50 supplying a signal CP'6, the state of the counter being indicated by its output signal cmp6.

The H1VC31 and H2VC31 bytes are detected in the manner previously described for the VC31a container.

Figure 14:
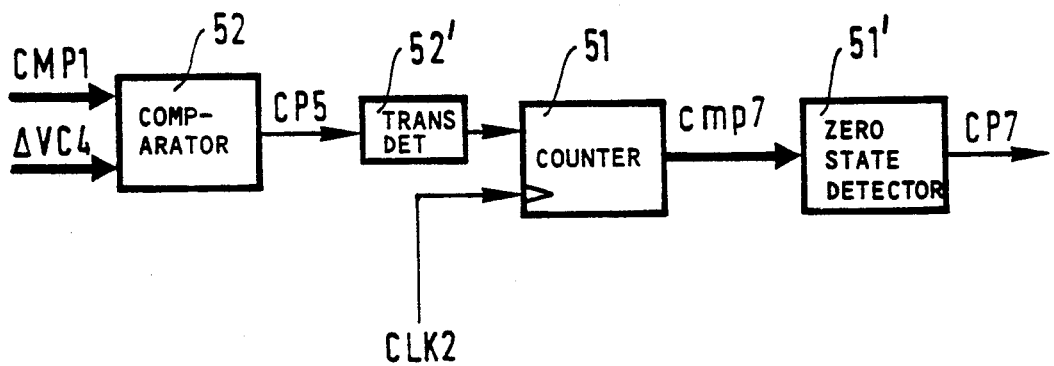
FIG. 14 is a diagram of a POHVC4 service signal byte detector circuit.

The bytes constituting the POHVC4 service signals 1, are detected, as shown in FIG. 14, by means of a detector 51' which detects eight consecutive passages through 0 of a counter 51 counting from 0 through to 260 (the number of bytes separating two consecutive POHVC4 bytes in a VC4 container) at the timing rate of the CLK2 clock signal and by detecting the first byte J1 of the VC4 container, in a similar manner to that described in relation to FIG. 9A, by detecting coincidence of the count state CMP1 of the counter 20 and the value VC4, using a comparator 52 providing an output signal CP5 having a transition in a given direction on detection of this coincidence, applied through a detector 52' for said given direction transition to the reset to zero input of the counter 51 to command the latter to count on such detection.

The circuit generating the CLK5 clock signal will now be described.

This circuit comprises an "AND" gate 130 which passes pulses of the column synchronization signal SC if the following conditions are met simultaneously (this simultaneity is detected by an "AND" gate 131):

presence of one of the time windows represented by the signals Q2 through Q5 (whence application of the output signal Q6 of the "OR" gate 101 (FIG. 9B) to an input of the "AND" gate 131), no detection of a POHVC4 byte (whence application of the signal CP7, inverted by an inverter 132, the "AND" gate 131), and no detection of an H1VC31 or H2VC31 indexing byte of any of the four VC31 containers (whence the application to an input of the "AND" gate 131 of the signal, inverted by an inverter 133, from an "OR" gate 134 receiving on its inputs the signals CP1 and CP2 relating to the four containers and assigned the indexes a for the VC31a container, b for the VC31b container, c for the VC31c container and d for the VC31d container.

The bytes forming the VC31a container detected in this way and extracted from the STM incoming frames at the times concerned are stored in a buffer 60 (see FIG. 16) as and when they are detected, one or two writes in the buffer 60, in other words one or two pulses of the CP'6 output signal of detector 50", being removed (see below) according to whether the VC31a container is not justified or is positive justified.

Non-justification or positive justification of the VC31a container is detected in a similar way to that described above for the VC34 container, this time on the basis of the H1VC31a and H2VC31a indexing signals constituted in the same manner as the H1VC4 and H2VC4 indexing signals.

The CP6 signal is obtained at the output of a circuit 53' for blocking pulses of the CP'6 signal either at the location of the H3VC31a byte signalled by the CP3 signal (FIG. 11), and four byte-times after this location, or four byte-times after this location, depending on the state of the logic signals NJVC31a indicating non-justification and JPVC31a indicating positive justification of the VC31a container.

Figure 16:
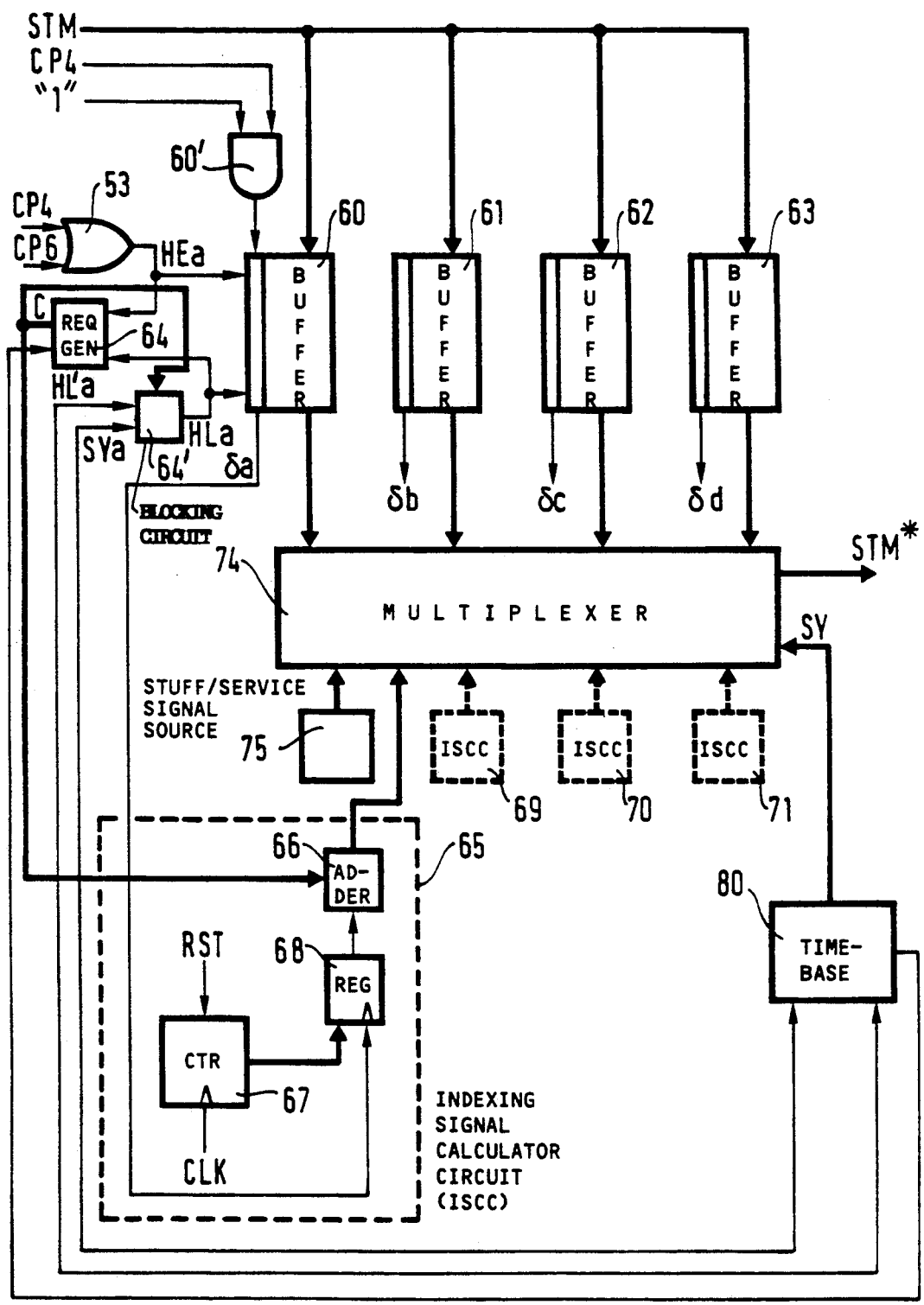
FIG. 16 is a diagram showing means for constituting restructured frames from the bytes of the containers to be processed, extracted from the incoming frames.

The same process is applied for the other three containers VC31b, VC31c, VC31d, the bytes of which are respectively stored in three buffers 61, 62, 63 (FIG. 16).

With each byte of a VC31 container stored in these buffers there is associated a marking bit δa, δb, δc, δd for the containers VC31a, VC31b, VC31c, VC31d and indicating whether this byte is the first byte of a container or not.

The writing of this marking bit is commanded in the case of the VC31a container, for example, by the CP4 signal supplied by the circuit for detecting the first byte of a VC31 container. In this example the bit δa is at logic "1" when the byte is the first byte. This signal is obtained at the output of an "AND" gate 60' receiving on a first input a logic "1" signal and on a second input the CP4 signal.

HE is the timing rate for extracting incoming frames from the bytes constituting these containers, in turn obtained in the case of the VC31a container, for example, by using a logic gate 53 to combine transitions of the CP4 output signal of the comparator 41 (FIG. 11) and the CP6 output signal of the detector 50" (FIG. 15).

The assignment of the byte-times of the restructured outgoing frames to these bytes is fixed by a clock HL' (HL'a in the case of the VC31a container, for example) itself determined in a timebase 80 from frame synchronization signal ST*, line synchronization signal SL* and column synchronization signal SC* of the outgoing frames restructured so as to have, for each container to be processed, an assignment of the bytes constituting this container by columns within the restructured frames.

Figure 17:
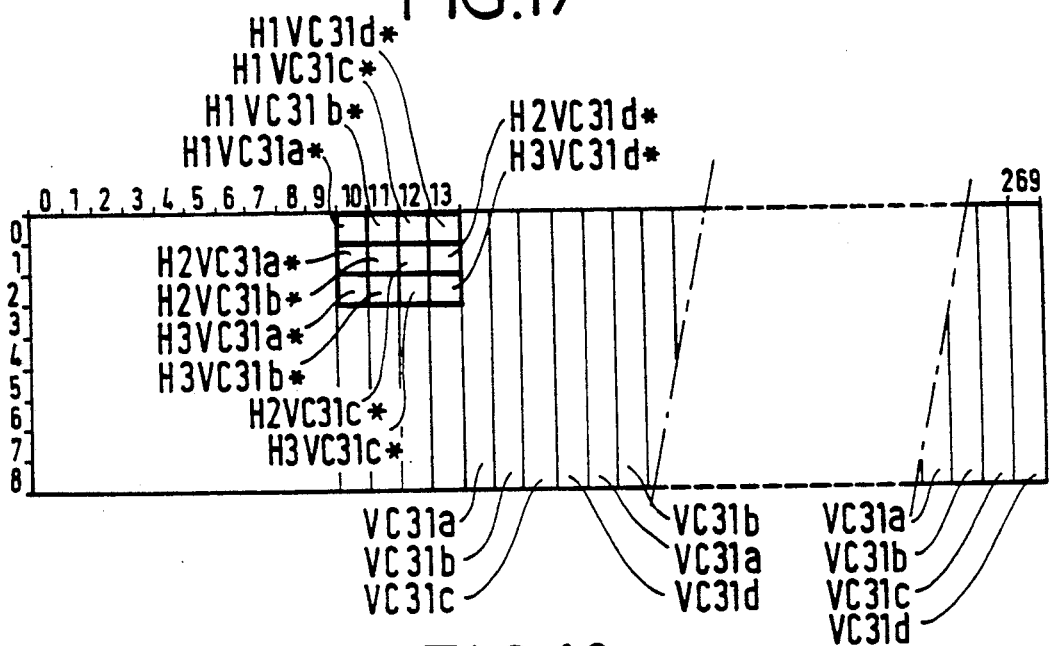
FIG. 17 is a diagram showing the structure of the restructured frames in the case where the containers to be processed are VC31 containers.

FIG. 17 shows this assignment by columns in the case of the VC31 containers.

The assignment is performed as follows:

columns 14, 18, . . . 266 and column 10 for lines 2 through 8 are assigned to the VC31a container, columns 15, 19, . . . 267 and column 11 for lines 2 through 8 are assigned to the VC31b container, columns 16, 20, . . . 268 and column 12 for lines 2 through 8 are assigned to the VC31c container, columns 17, 21, . . . 269 and column 13 for lines 2 through 8 are assigned to the VC31d container.

The bytes from columns 0 through 9 of lines 0 through 8 are stuff and/or service bytes.

Into columns 10 through 13 of lines 0 and 1 are inserted indexing bytes H1VC31* and H2VC31* of the containers to be processed, with the index a, b, c or d according to whether they relate to the VC31a, VC31b, VC31c or VC31d container.

The justification bytes of the containers to process in the restructured frames enable the timing rate of the read clock HL to be matched to the timing rate of the write clock HE of the buffers, for example the timing rate of the read clock HLa is matched to the timing rate of the write clock HEa in the case of the buffer 60. This timing adaptation is performed conventionally by means of a device for generating justification/non-justification requests (64 in the case of the VC31a container) and a circuit for blocking the clock HL' (64' in the case of the VC31a container), the justification/non-justification request generator device comparing the phases of the clock HE and the clock HL from the circuit for blocking the clock HL'. Depending on whether, for a given frame, the result of this comparison exceeds a first threshold of given sign or a second threshold of opposite sign or lies between these two thresholds, a positive justification request or a negative justification request or a non-justification request is generated for this frame. The non-justification, positive justification or negative justification request is acted on in the following frame and, in the first case, causes the insertion of a stuff byte at the location, fixed in this frame, of the corresponding justification byte H3VC31*, this location being in column 10, line 2 in the case of the VC31a container, for example; in the second case, insertion of a stuff byte at this location and at the location four byte-times later; and, in the third case, no insertion of a stuff byte into those of columns 10 through 269 assigned to the container concerned.

The justification or non-justification request generated by the device 64 for the frame in question is stored by this device until the next frame, the memory in which it is stored being reset on a command from the timebase 80 at the respective locations in columns 14 through 17 of line 2 for the VC31a, VC31b, VC31c, VC31d containers.

The buffer read clock HL is therefore derived from the clock HL' (itself sourced from the timebase 80 and obtained from the restructured frame column synchronization signal SC* by systematically blocking this synchronization signal at the locations of bytes not assigned to the VC31 container in question and indicated previously), by blocking or not the clock HL' according to the justification/non-justification request status for the VC31 container for the previous frame.

The HLa read clock is therefore obtained from the HL'a clock by blocking the latter in columns 10 and 14 of line 2 in the case of positive justification of the VC31a container in the restructured frames or in column 10 of line 2 in the case of non-justification of the VC31a container in the restructured frames or by not blocking the clock in the case of negative justification of the VC31a container in the restructured frames.

The blocking circuit 64' receives from the timebase 80, in addition to the clock HL'a, a synchronization signal SYa identifying the locations mentioned above, and control signals C from the justification/non-justification request generator device 64 indicating justification or non-justification requests for the VC31a container in the restructured frame.

The value, referred to hereinafter as the "calculated" value, of the H1VC31*, H2VC31* indexing bytes to be inserted in columns 10 through 13 of lines 0 and 1 of a given restructured frame during the formation of that frame is calculated, for the VC31a container, for example, by a circuit 65 for calculating the value of the indexing signals for this container, from the "observed" value of these indexing bytes for the previous frame, determined during the construction of the previous frame (as described below) by adding the value "1", "−1" or "0" to this value, using an adder 66 receiving control signals C from the device 64 according to whether a positive or negative justification request or no justification request has been executed.

The "observed" value of the indexing bytes is obtained as follows, taking for example the H1VC31a* and H2VC31a* bytes of the VC31a container.

A counter 67 reset to zero by a signal RST in column 14 of line 2 (detected from the frame synchronization signal ST*, line synchronization signal SL* and column synchronization signal SC* of the restructured outgoing frames) is incremented by a clock signal CLK derived from the column synchronization signal SC* of the restructured outgoing frames by taking one byte in four and blocking it in columns 0 through 9 of lines 3 through 8 and in columns 0 through 13 of lines 0 through 2. When a first byte of a VC31a container is detected at the output of the buffer 60, by virtue of the corresponding marking bit δa, the count state of this counter, representing the required value, is stored in a register 68 whose clock input receives the δa bit read in the buffer 60, the data inputs of this register being connected to the outputs of the counter 67.

The restructured frames STM* are obtained at the output of a multiplexer 74 whose data inputs are connected to the respective circuits 65, 69, 70 and 71 for calculating the value of the H1VC31* and H2VC31* indexing signals for the VC31a, VC31b, VC31c, VC31d containers, to the outputs of the four buffers 60 through 63 (the signals constituting the VC31a, VC31b, VC31c, VC31d containers) and to the outputs of a source 75 stuff and/or service signals.

The control inputs of the multiplexer 74 receive signals SY from the timebase 80 enabling insertion of indexing signals in columns 10 through 13 of lines 0 and 1, insertion of stuff and/or service signals in columns 0 through 9 of lines 0 through 8 and insertion of signals constituting containers to be processed as described above.

In the case of the VC31a container, for example, the insertion of stuff signals in columns 10 and 14 of line 2 in the case of positive justification of this container or in column 10 of line 2 in the case of non-justification of this container can be achieved in a simple way by rereading a byte stored in the buffer 60, by blocking the read clock of this buffer at these locations.

Figure 18:
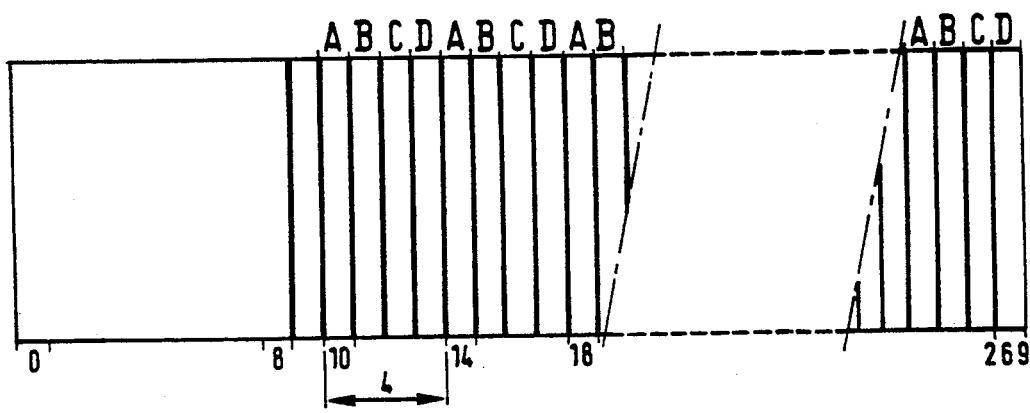
FIG. 18 shows the assignment of the columns of restructured frames to the various restructured multiplexing units in the case where the containers to be processed are VC31 containers.

FIG. 18 shows the assignment of the columns of the restructured frames to the various restructured multiplexing units TU31*. ABCD are the columns respectively assigned to the restructured multiplexing units TU31*a, TU31*b, TU31*c, TU31*d.

The A columns are the columns 10, 14 ... 266.
The B columns are the columns 11, 15 ... 267.
The C columns are the columns 12, 16 ... 268.
The D columns are the columns 13, 17 ... 269.

The number of columns assigned per frame to each restructured multiplexing unit TU31* is equal to the number of bytes assigned to the corresponding multiplexing unit in a non-restructured frame divided by the number of lines (that is: 585/9 = 65).

Figure 19:
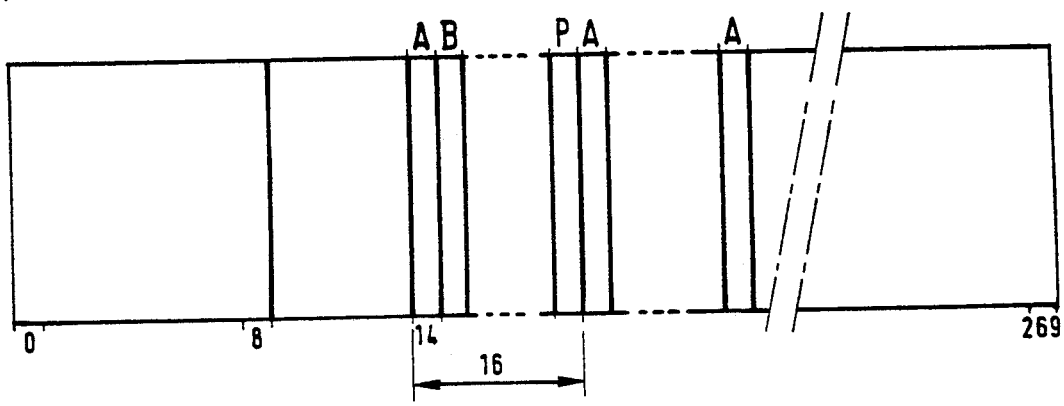
FIGS. 19 and 20 are diagrams showing the assignment of the restructured frame columns for other examples of containers to be processed.

If the VC4 containers of the incoming frames contain, for example, 16 VC22 (whether the VC4 containers are obtained by multiplexing 16 TUG22 or by multiplexing four TU31 each containing a VC31 obtained by multiplexing four TUG22 each containing a VC22) and where the containers to be processed were all VC22 containers, the number of columns ABCD ... P (shown in FIG. 19) of the restructured frames assigned per frame to each restructured multiplexing unit TUG22* would be equal to 144/9 = 16, the four remaining columns up to 260 (columns 10 through 13 in this instance) being then filled with stuff bytes.

The containers to be processed could instead be containers constituted at different levels of the multiplexing hierarchy.

Figure 1:
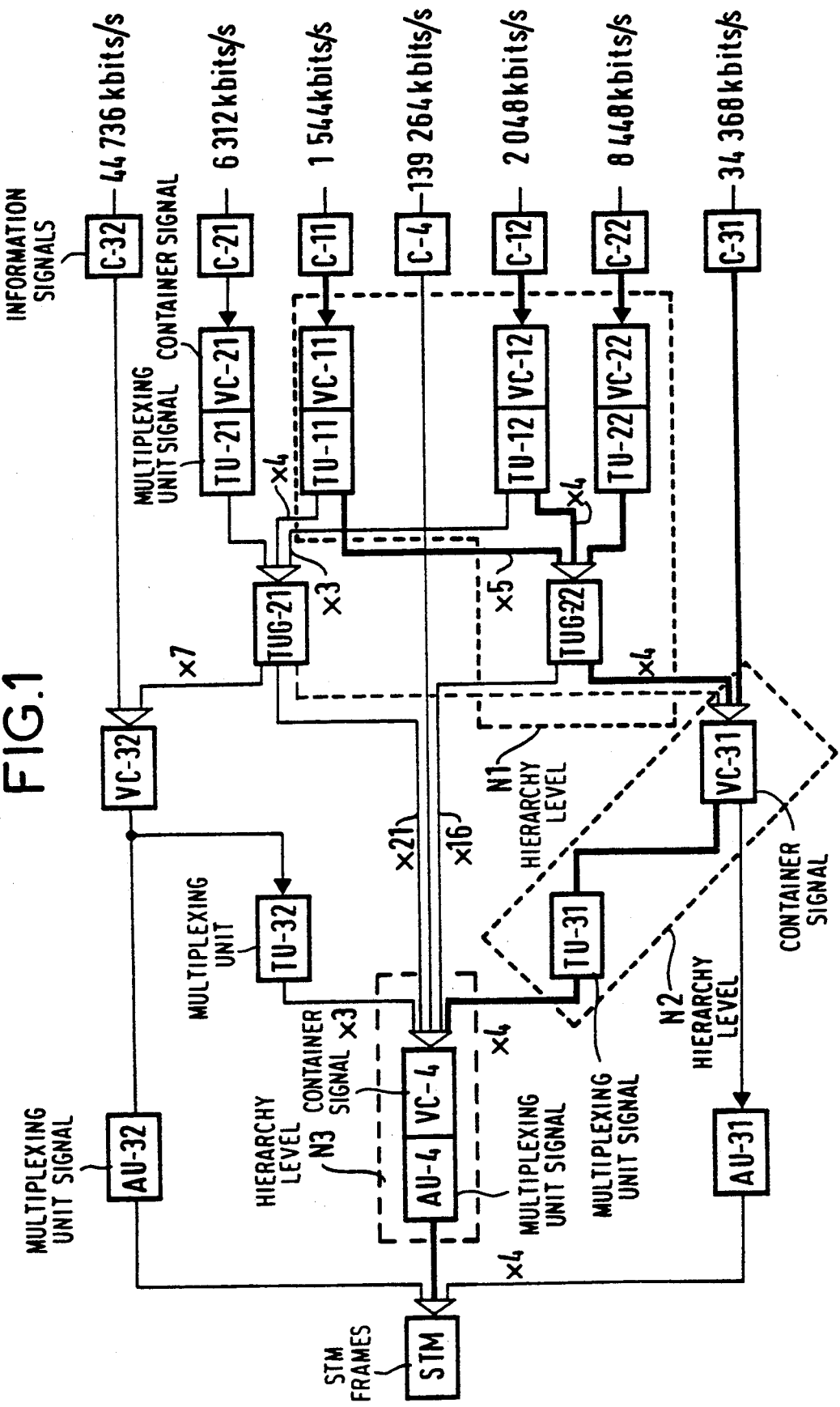
FIG. 1 is a diagram illustrating a synchronous multiplexing hierarchy.
Figure 2:
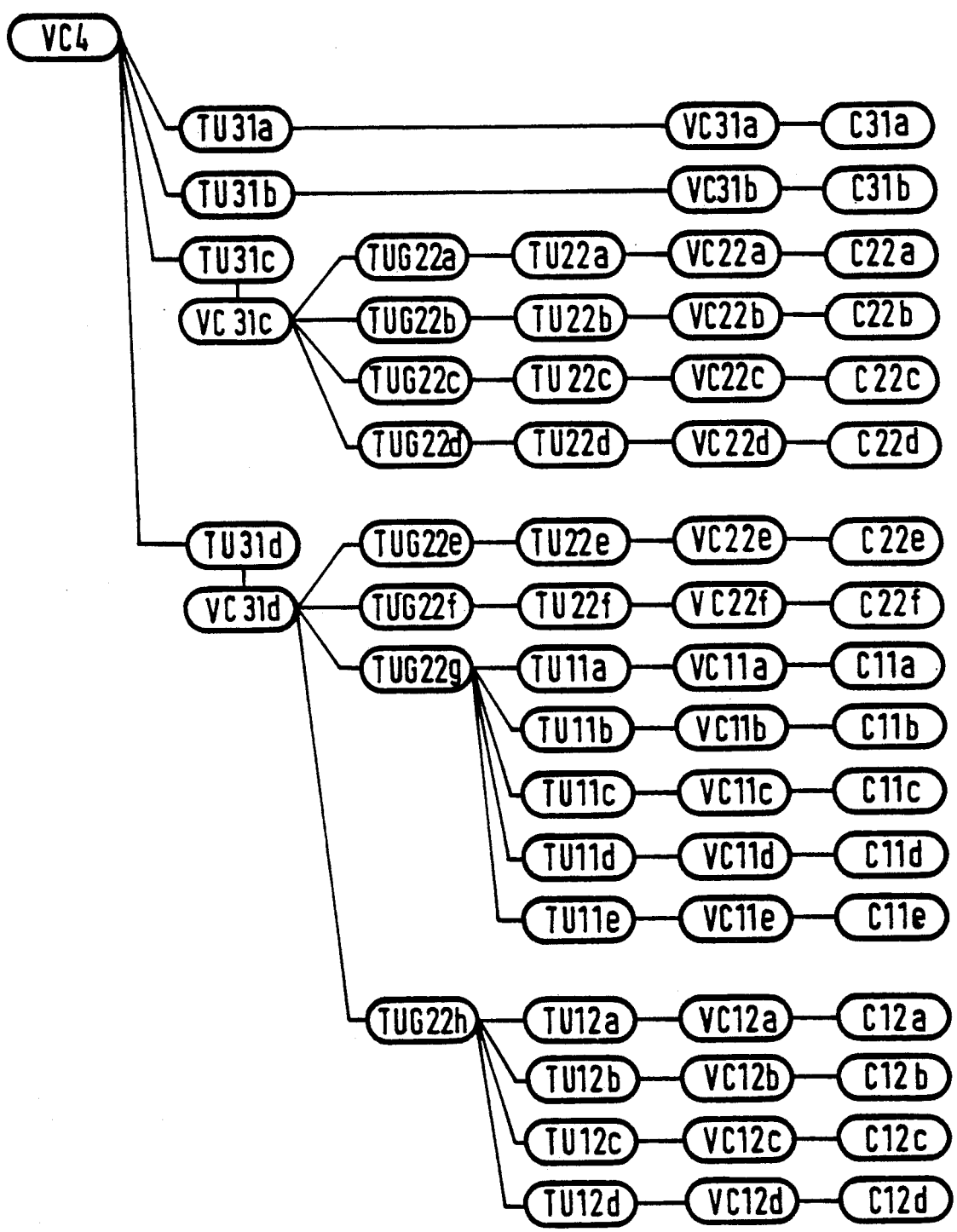
FIG. 2 is a schematic diagram showing formation of containers or multiplexing units of a multiplexing structure.
Figure 3:
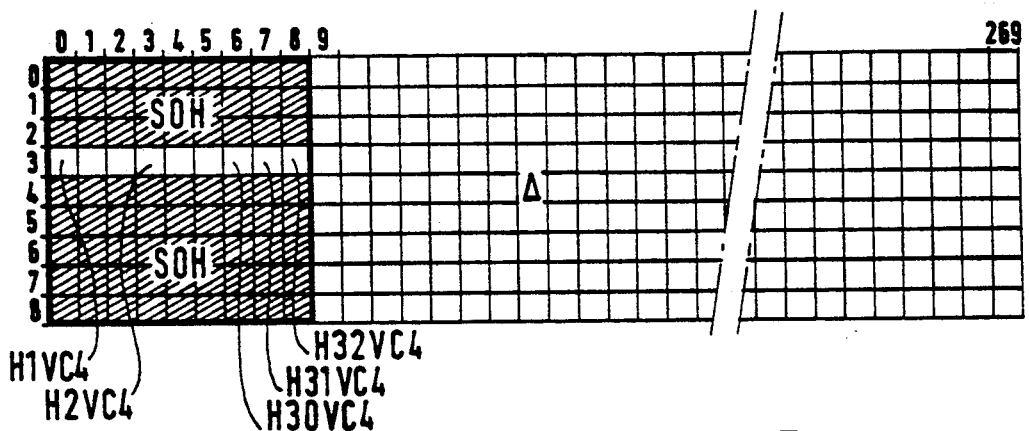
FIG. 3 is a diagram of a conventional frame resulting from synchronous hierarchical multiplexing.
Figure 20:
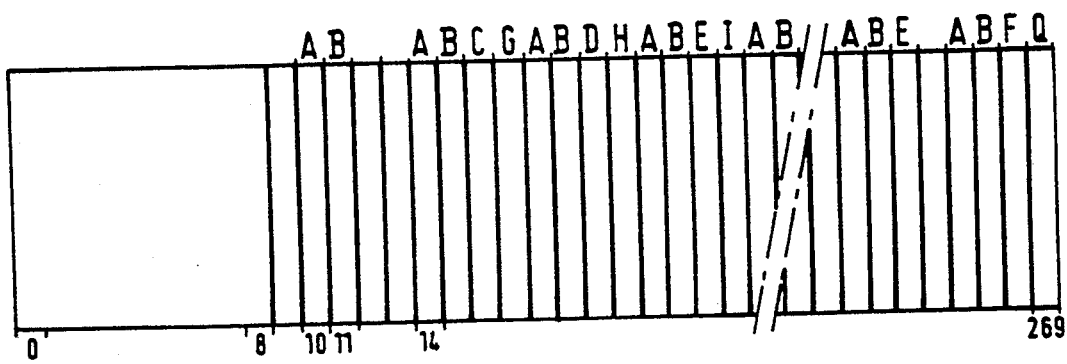

FIG. 20 shows by way of example the assignment of the columns of the restructured frames to the restructured multiplexing units TU31a*, TU31b*, TU22a* through TU22f*, TU11a* through TU11e* and TU12a* through TU12d* in the case of the multiplexing structure described with reference to FIG. 2 and where the containers to be processed are the containers VC31a, VC31b, VC22a through VC22f, VC11a through VC11e and VC12a through VC12d.

Columns ABCD ... Q are the columns respectively assigned to these restructured multiplexing units. Columns 10 and 11 are respectively A and B columns assigned respectively to the restructured multiplexing units TU31a* and TU31b* and contain, for example, in lines 0 and 1 the indexing bytes H1VC31a*, H1VC31b*, H2VC31a* and H2VC31b* and in line 2 the justification bytes H3VC31a* and H3VC31b*. As the other restructured multiplexing units are of lower level in the hierarchy, columns 12 and 13 contain stuff bytes.

The organization into columns from column 14 through column 77 is as follows: ABCG ABDH ABEI ABFN ABCG ABDH ABEJ ABFO ABCG ABDH ABEK ABFP ABCG ABDH ABEL ABFQ. From column 78 through column 141 and then from column 142 through column 205 and finally from 206 through 269 this organization is repeated except that columns 89, 105, 121, 137 and then columns 153, 169, 185, 201 and finally 217, 233, 249, 265 are respectively M, I, J, K columns, then L, M, I, J columns and finally K, L, M, stuff columns instead of I, J, K, L columns like columns 25, 41, 57, 73, respectively.

The assignment of the columns of the restructured frames to the various restructured multiplexing units in the case of multiplexing structures other than that described above by way of example is based on the general principles explained above and on numeric values specific to each case.

This assignment by columns makes it possible to insert into the restructured frames signals constituting containers to be processed as well as indexing and justification signals for matching the timing rates for extraction of non-restructured frames and of insertion into restructured frames at elementary locations which, for the same container to be processed, have within each line or section of restructured frame ranks defined relative to the start of the section, these ranks being invariant from one frame section to another and each set of same-rank locations of restructured frame sections being assigned to at most one restructured multiplexing unit.

We claim:

1. A frame restructuring apparatus for digital bit streams multiplexed by time-division multiplexing digital tributaries at different bit rates according to a synchronous multiplexing hierarchy, said synchronous multiplexing hierarchy including various hierarchy levels at which tributaries can be introduced, said tributaries being constituted by signal entities referred to hereinafter as containers and multiplexing units, the multiplexing units being formed by associating justification and indexing signals to containers constituted at the same hierarchy level for indexing and justifying said containers relative to said multiplexing units, the containers at a given hierarchy level being formed by one of (i) multiplex signals obtained by multiplexing the multiplexing units constituted by a hierarchy level lower than said given hierarchy level and (ii) signals from said tributaries at said given hierarchy level, frames being formed by adding service signals to one of (i) the multiplexing units constituted at a highest one of said hierarchy levels and (ii) a multiplex signal of the multiplexing units constituted at a lower hierarchy level, said apparatus operable with equipment for processing said frames by containers referred to hereinafter as containers to be processed, and said apparatus comprising:

extracting means for extracting from incoming frames signals constituting said containers to be processed; and restructuring means for constituting, and for multiplexing into restructured frames subdivided into sections of the same length, restructured multiplexing units respectively representing said containers to be processed, by inserting signals constituting said containers to be processed, as well as indexing and justification signals for adapting extraction and insertion timing rates of the signals constituting said containers to be processed, at locations which for a given container to be processed have ranks within each restructured frame section defined relative to the start of the restructured frame section, said ranks being invariant from one frame section to another and from one frame to another, and each of a set of locations corresponding to the same rank of the restructured frame section being assigned to at most one restructured multiplexing unit.

2. A frame reinstructing apparatus according to claim 1, wherein the number of locations allocated per each of the restructured frame sections to the same restructured multiplexing unit is equal to the number of locations assigned to the corresponding multiplexing unit in the non-restructured frames divided by the number of the restructured frame sections.

3. A frame restructuring apparatus according to claim 1, wherein said justification signals comprise positive justification signals and negative justification signals, wherein said extracting means extracts the signals constituting a container to be processed from the incoming frames, of a given hierarchy level, and comprises detection means for detecting locations of the incoming frame occupied by the signals constituting said container, and wherein said detection means comprises:

counting means for producing a clock signal by detecting count states of the same value between 0 and n of a modulo n counter where n designates the number of containers of a given hierarchy level multiplexed within a higher hierarchy level container or multiplexed at the hierarchy level in question if the latter is the highest hierarchy level, said counting means being reset to zero by means for detecting a first location of the incoming frames occupied by the container in question, and being incremented by means for detecting the locations of incoming frames occupied by signals constituting a higher level container if the level in question is not the highest hierarchy level or by signals constituting a frame and not assigned to service signals otherwise, except in the case of those occupied by the indexing signals of the container or containers of the level in question, at specific positions either relative to the first location occupied by the higher level container, if the level in question is not the highest hierarchy level, or within the frames otherwise, and except for those assigned to the positive and negative justification signals, or to the positive justification signals, according to whether the higher level container in question is positive justified or not justified, and blocking means for blocking the clock signal at the locations assigned to the positive and negative justification signals of the container in question or to the positive justification signals of the container according to whether said container is positive justified or not justified.

4. A frame restructuring apparatus according to claim 1, wherein said justification signals comprises positive justification signals and negative justification signals, wherein said extracting means extracts the signals constituting a container to be processed from the incoming frames, of a given hierarchy level, and comprises detection means for detecting locations of the incoming frame occupied by the signals constituting a highest level container, and wherein said detection means comprises:

first means for detecting signals constituting a higher level container;

second means for detecting signals constituting corresponding containers of different hierarchy levels between the highest level and the higher level in question, within containers of respective higher level, counting means for producing a clock signals by detecting count states of the same value between 0 and n of the modulo n counter where n designates the number of containers of the given hierarchy level multiplexed within the higher hierarchy level container or multiplexed at the hierarchy level in question if the latter is the highest hierarchy level, said counting means being reset to zero by means for detecting the first location of the incoming frames occupied by the container in question, and being incremented by means for detecting the locations of incoming frames occupied by signals constituting the higher level container if the level in question is not the highest hierarchy level or by signals constituting a frame and not assigned to service signals otherwise, except in the case of those occupied by the indexing signals of the container or containers of the level in question, at specific positions either relative to the first location occupied by the higher level container, if the level in question is not the highest hierarchy level, or within the frames otherwise and except for those assigned to the positive and negative justification signals, or to the positive justification signals, according to whether the higher level container in question is positive justified or not justified, and blocking means for blocking the clock signal at the locations assigned to the positive and negative justification signals of the container in question or to the positive justification signals of the container according to whether said container is positive justified or not justified.

5. A frame restructuring apparatus according to claim 3, wherein the first location occupied by a container of any level $N_i$ is indicated by the indexing signal of said container at a specific position relative to the first location occupied by the container of higher level $N_{i+1}$, if the level $N_i$ is not the highest hierarchy level, or within the frames otherwise, said specific position being defined by an offset relative to a reference location at a specific position relative to the first location occupied by the container at the level $N_{i+1}$ if the level $N_i$ is not the highest hierarchy level, or within the frame otherwise, wherein said first detection means, which detects the first location occupied by a level $N_i$, comprises:

a counter reset to zero on detection of said reference location and incremented every n locations occupied by a signal constituting a level $N_{i+1}$ container, if the level $N_i$ is not the highest hierarchy level, or all the locations not assigned to service signals in the incoming frames otherwise, and a comparator comparing the successive values from said counter with the value of the indexing signal of the container in question, said detection being operative in the event of coincidence.

6. A frame restructuring apparatus according to claim 1, comprising:

buffers in which are read, at the timing rate they are inserted into the restructured frames, the signals constituting said containers to be processed, previously written at the timing rate at which they are extracted from the incoming frame, and means, for each container to be processed, for generating justification/non-justification requests for a restructured frame by comparing the read and write timing rates of the buffer assigned to said container during the formation of said restructured frame and determining the justification signals of the containers to be processed for the next restructured frame.

7. A frame restructuring apparatus according to claim 6, wherein the value of the indexing signals to be inserted into a given restructured frame is obtained from an indexing value observed during the formation of the previous restructured frame by adding to it or subtracting from it the value "1" or the value "0" according to whether a positive or negative justification request or no justification request has been detected during the formation of the previous restructured frame.

8. A frame restructured apparatus according to claim 7, wherein the indexing value observed for the previous restructured frame is obtained by adding to each signal constituting a container to be processed, stored in a buffer, a marking signal indicating for said signal whether it is the first signal of said container and using a counter incremented at the timing rate for inserting signals constituting said container into the restructured frames, said counter being halted on detecting a marking signal at the output of the corresponding buffer, the value reached by said counter then constituting the required indexing value.

* * * * *